(12) United States Patent
Libault et al.

(10) Patent No.: US 9,185,159 B2
(45) Date of Patent: Nov. 10, 2015

(54) COMMUNICATION BETWEEN A SERVER AND A TERMINAL

(75) Inventors: David Libault, Paris (FR); Jerome Gonzalez, Paris (FR)

(73) Assignee: CY-PLAY, Paris (FR)

( * ) Notice: Subject to any disclaimer, the term of this patent is extended or adjusted under 35 U.S.C. 154(b) by 770 days.

(21) Appl. No.: 13/142,695

(22) PCT Filed: Dec. 31, 2009

(86) PCT No.: PCT/FR2009/001492
§ 371 (c)(1),
(2), (4) Date: Jun. 29, 2011

(87) PCT Pub. No.: WO2010/076436
PCT Pub. Date: Jul. 8, 2010

(65) Prior Publication Data
US 2011/0269508 A1    Nov. 3, 2011

(30) Foreign Application Priority Data

| Dec. 31, 2008 | (FR) | 08 59173 |
| Dec. 31, 2008 | (FR) | 08 59174 |
| Dec. 31, 2008 | (FR) | 08 59175 |
| Dec. 31, 2008 | (FR) | 08 59176 |
| Dec. 31, 2008 | (FR) | 08 59177 |

(51) Int. Cl.
*G09G 5/02* (2006.01)
*H04L 29/08* (2006.01)
(Continued)

(52) U.S. Cl.
CPC ............ *H04L 67/08* (2013.01); *H04L 67/04* (2013.01); *H04L 67/38* (2013.01);
(Continued)

(58) Field of Classification Search
USPC ............................................. 345/592
See application file for complete search history.

(56) References Cited

U.S. PATENT DOCUMENTS

| 6,078,721 A * | 6/2000 | Uchimi et al. ............... 386/314 |
| 6,288,704 B1 | 9/2001 | Flack et al. |

(Continued)

FOREIGN PATENT DOCUMENTS

| EP | 0 414 017 A2 | 2/1991 |
| EP | 0 475 648 A1 | 3/1992 |

(Continued)

OTHER PUBLICATIONS

International Search Report, dated Oct. 11, 2010, from corresponding PCT application.

*Primary Examiner* — Mark Zimmerman
*Assistant Examiner* — F. M. Hossain
(74) *Attorney, Agent, or Firm* — Young & Thompson

(57) ABSTRACT

In process for modeling a display coming from an application on a server, the display being destined for a remote terminal, the display is modeled to compose an image according to display information coming from the application by stacked layers, each layer consisting of pixels and being associated with a corresponding first alteration data set, each pixel being characterized by a transparency factor of the pixel; the first alteration data set indicating characteristics of the layer connected with the alterations performed by the application, the resulting image consisting of image pixels and being associated with a second alteration data set, the second alteration data set indicating whether the image was altered due to the modification of the layers by the application, the image pixels being composed of the superimposed corresponding pixels of the layers.

14 Claims, 19 Drawing Sheets

(51) Int. Cl.
*H04N 7/173* (2011.01)
*H04N 21/2343* (2011.01)
*H04N 21/2381* (2011.01)
*H04N 21/2383* (2011.01)
*H04N 21/414* (2011.01)
*H04N 21/422* (2011.01)
*H04N 21/431* (2011.01)
*H04N 21/44* (2011.01)
*H04L 29/06* (2006.01)
*H04N 19/51* (2014.01)
*H04N 19/30* (2014.01)
*H04N 19/61* (2014.01)
*H04N 19/85* (2014.01)
*H04M 1/725* (2006.01)

(52) U.S. Cl.
CPC .......... *H04N 7/17318* (2013.01); *H04N 19/30* (2014.11); *H04N 19/51* (2014.11); *H04N 19/61* (2014.11); *H04N 19/85* (2014.11); *H04N 21/2381* (2013.01); *H04N 21/2383* (2013.01); *H04N 21/234327* (2013.01); *H04N 21/41407* (2013.01); *H04N 21/42202* (2013.01); *H04N 21/4312* (2013.01); *H04N 21/4314* (2013.01); *H04N 21/44012* (2013.01); *H04M 1/7253* (2013.01)

(56) References Cited

U.S. PATENT DOCUMENTS 6,631,418 B1 * 10/2003 Watkins ................... 709/231
7,142,599 B2 * 11/2006 Henocq ................ 375/240.03
2005/0018768 A1   1/2005 Mabey et al.
2006/0230162 A1 * 10/2006 Chen et al. ................ 709/229

FOREIGN PATENT DOCUMENTS

| | | |
|---|---|---|
| FR | 2 870 374 A1 | 11/2005 |
| WO | 97/13220 A1 | 4/1997 |
| WO | 01/31497 A1 | 5/2001 |
| WO | 03/045045 A2 | 5/2003 |
| WO | 2006/036069 A1 | 4/2006 |
| WO | 2008/007228 A2 | 1/2008 |

\* cited by examiner

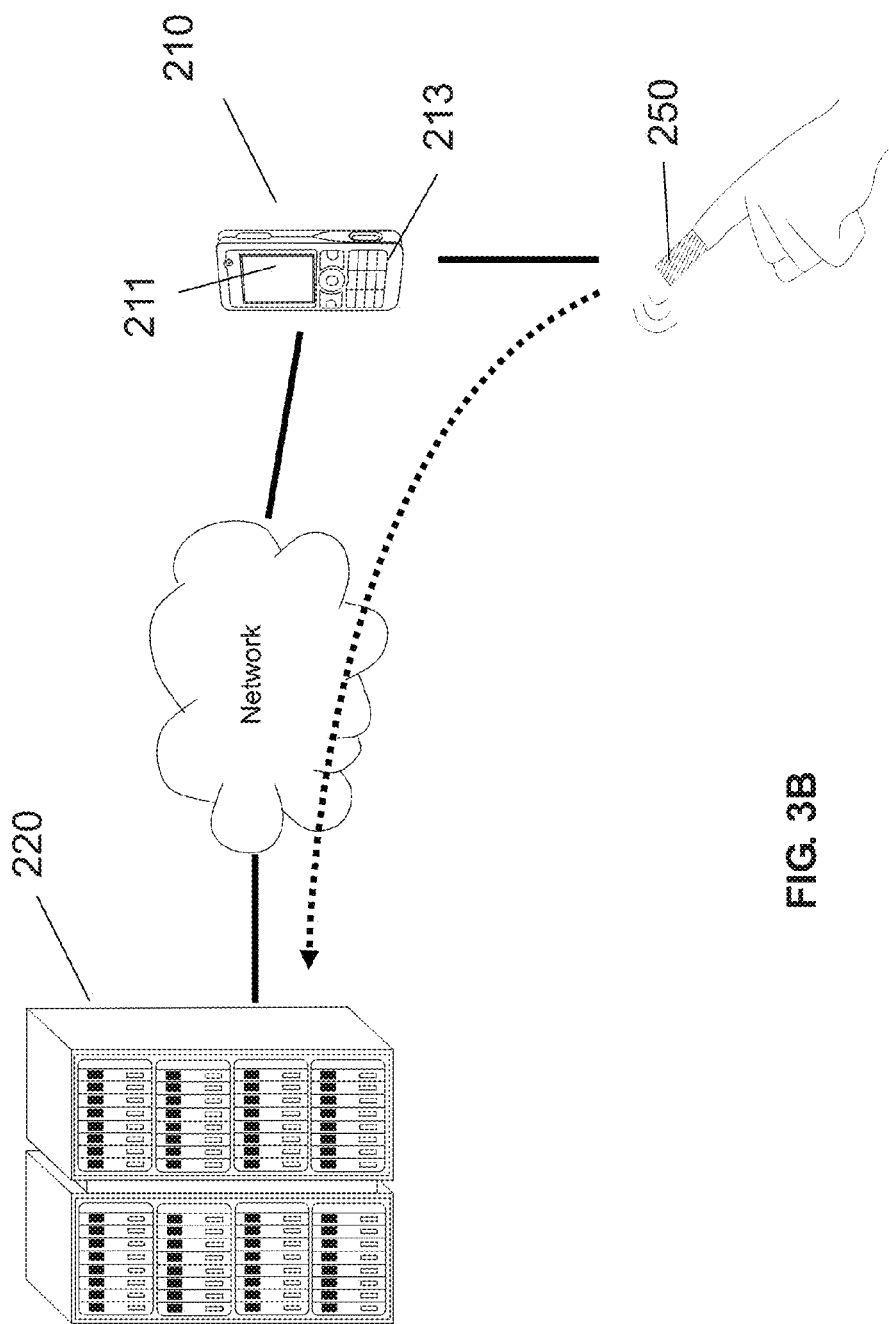

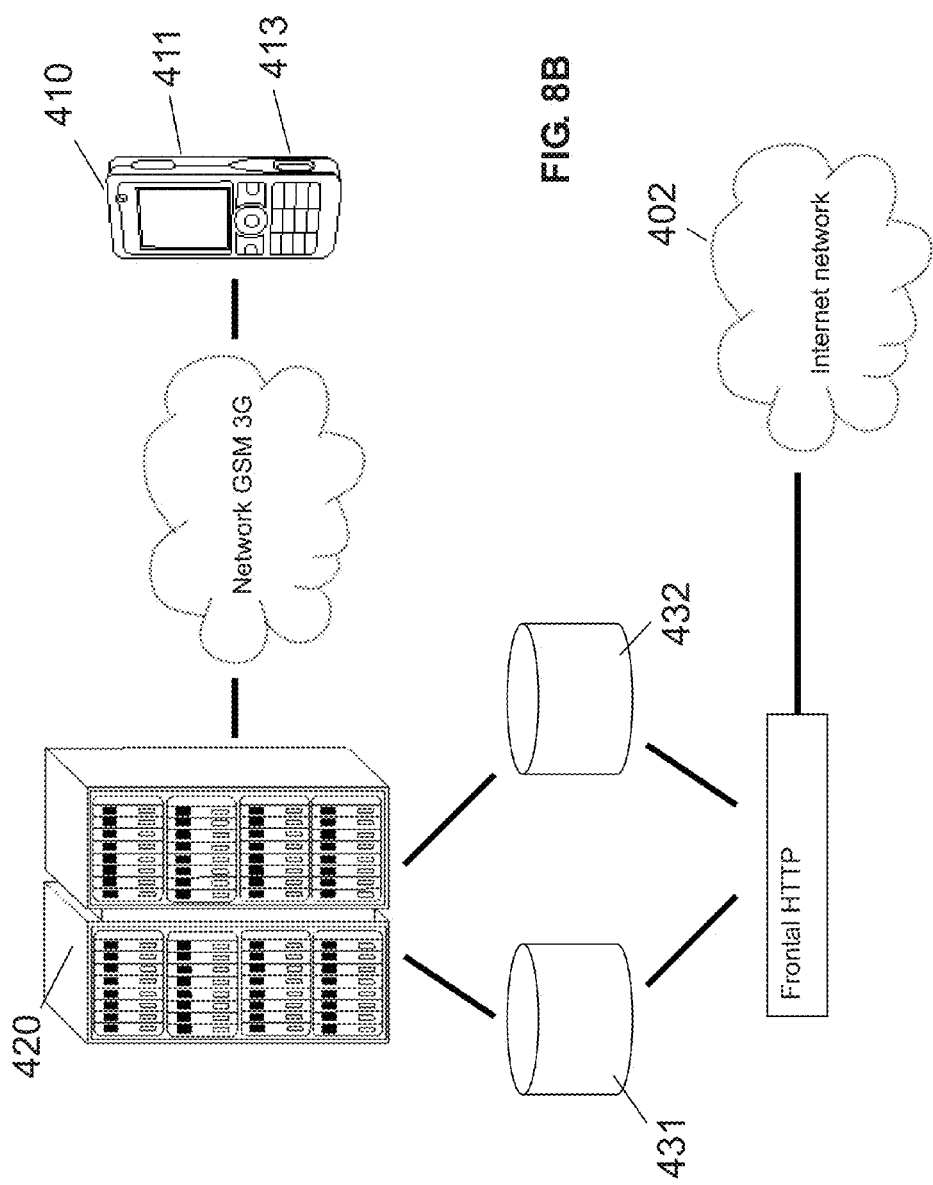

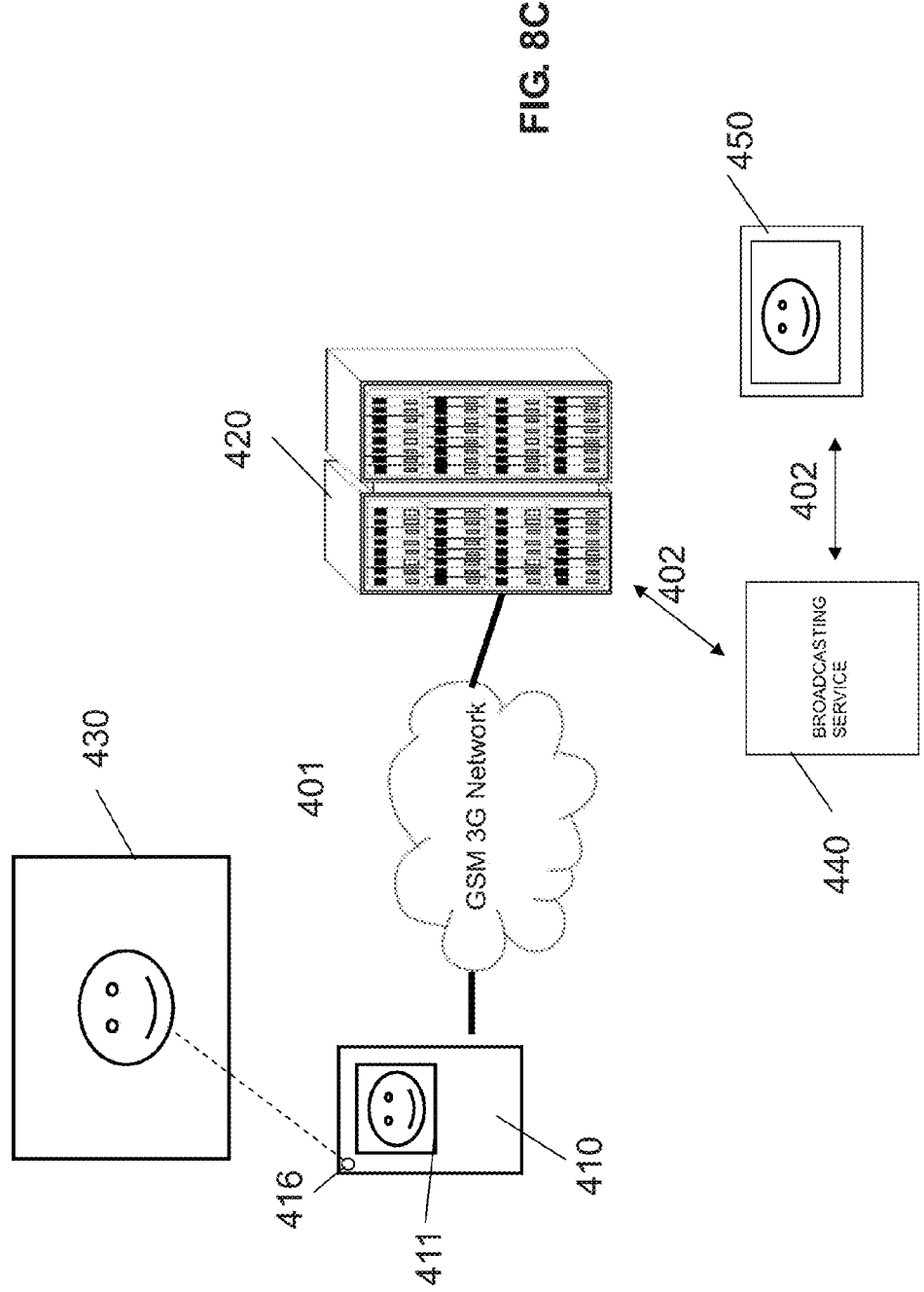

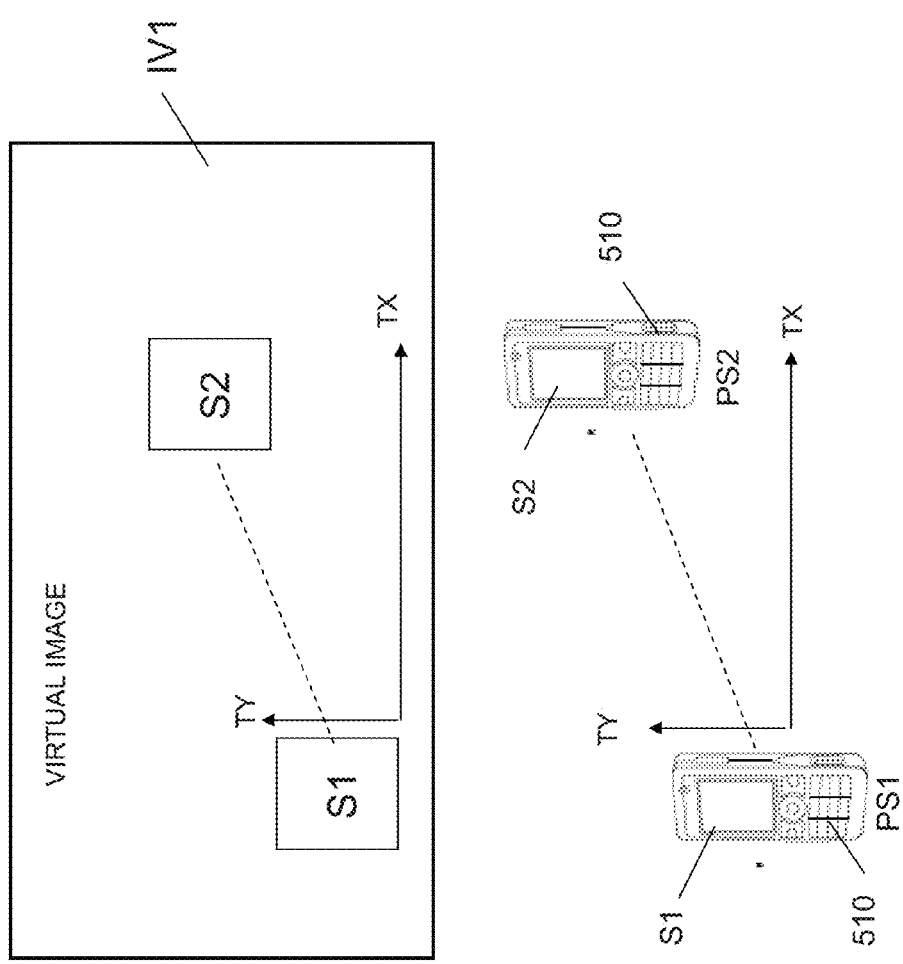

COMMUNICATION BETWEEN A SERVER AND A TERMINAL

Some aspects of the present invention relate to a method of communication between a server and a terminal.

One aspect of the present invention relates to a method and a device for modeling a display. Another aspect of the present invention relates to a method for exchanging data between an application executing on a remote server and a terminal; and a method for interaction of a terminal with an application executing on a remote server. Other aspects of the present invention relate to a method allowing a user of a mobile terminal to navigate in an application executing on a remote server. Another aspect of the present invention relates to a method for putting audio and/or video data on-line.

Some embodiments of the aspects of the invention can be applied in a field where a mobile terminal uses an application to gain access to a service, for example. Some aspects of the invention could be used within the scope of a system allowing for example the display on a terminal of a display of a user interface of an application executing on a server remote from the terminal.

In this context an application can consist for example of consulting information such as the weather, the stock market, the balance of a bank account, a photograph album, or of broadcasting multimedia content such as videos.

To provide a service to a user on his mobile telephone, there are two solutions—install an application on the user's terminal or use the terminal's Web browser to gain access to a remote application.

In the first case, the user must download a file, install it on his handset, then ask the operating system to launch it. This process implies that the downloaded executable is compatible at the binary level, and at the level of the resources run on the user's handset.

The JAVA technology developed by Sun offers to use a universal binary code for all applications, and a "virtual machine" is installed on each terminal. This virtual machine, specific to each type of terminal, translates the universal binary code into binary code executable by the terminal. Besides the additional computation load imposed by this translation, this technology does not resolve the problem of the disparity in computation power, in memory and in screen size in the pool of deployed mobile devices.

JAVA technology is today deployed on the majority of mobile telephones. However, to adapt to the evolution of mobile telephones and to meet the need of the manufacturers to differentiate their products, the JAVA APIs have evolved and have multiplied. The JAVA versions therefore differ from one terminal to another depending on the date when it was put on the market, and the price range in which it is situated. It is therefore a very complicated matter for a publisher to supply a application that is deployable within the entire heterogeneous pool of mobile terminals.

For the user, the steps of searching for a version of the application that is compatible with his terminal, downloading and installing are tedious, and constitute a real impediment to its use.

In the second case, the application executes on a server accessible through an IP network. The terminal's Web browser is used to display the user interface produced by the application in the form of more or less sophisticated Web pages. This is used by Google for various applications: messaging, calendar, word processing, spreadsheets, etc.

The transposition of this model into mobile telephony presents several difficulties. Indeed, Web standards are evolving rapidly, drawn by the personal computer market: evolution of JavaScript, appearance of Flash technology, etc. Firstly, computing power, memory size as well as display capabilities are changing faster than for mobile terminals, these being strongly subject to the weight-battery life-bulk tradeoff. Secondly, personal computers undergo regular software updates, often automatically, which allow them to be up to date on the latest changes in Web standards. That is not the case for mobile telephones for two main reasons: each telephone having a specific operating system, or no operating system at all, the entire firmware must be altered, tested and then validated, this being the case for every handset model. Only the manufacturer can carry out this complex and therefore costly operation, which in the case of low-cost terminals is not justified. The cost of 3G data bandwidth remains high and heavily dependent on the operator and on the type of subscription plan selected by the user, which makes the automatic update models inapplicable at the present time.

Furthermore, Web standards are not suited to small screen sizes. The selection of character fonts, the arrangement of the various graphic elements (titles, text, images . . . ), being left to the terminal, give a graphic rendering that differs from one mobile device to another depending on the screen resolution and the display organization decisions made by the on-board Web browser.

The WAP definition was an attempt to adapt Web technologies to mobile telephony. Its failure is probably due to the disparity in rendering pages on each terminal, as well as to the insufficiency of display capabilities and to the absence of "rich media" type rendering.

In the context of video encoding, the criteria that allow evaluation of the quality of the video encoding used to send data to a terminal include:

The consumption of server resources (memory/processor);
The time interval between the alteration of the user interface image by the application and its display on the terminal;
The rendering quality of static images; and
The robustness of the generated stream with respect to the inevitable loss of packets over a wireless link.

The consumption of system resources should be minimized in order to maximize the number of simultaneous calls served.

Furthermore, the delay generated by the compression/decompression of the data should be minimized in order to offer the best application responsiveness to the user's demands. The information provided by an application being in part a succession of static text and images, their rendering should be optimal.

In addition, in a wireless environment loss of packets is inevitable. It is therefore desirable to minimize the impact of such losses on the quality of the image presented by the terminal to the user.

The improvements made to the coder in this context should be done without deviating from standardized video compression standards. In the case of Visio 3G, for example, the applicable standards are h263 and h264 contained in protocol H324m.

H324m is a protocol for setting up and carrying an audiovisual conference over a bidirectional digital channel. It is in fact a unified and harmonized family of protocols.

The H223 protocol defines data multiplexing/demultiplexing.
The H245 protocol defines the format of frames allowing negotiation of the opening of audio and video channels, as well as the associated codecs.
The H263 protocol defines video encoding.
Protocols G723.1 and 3GP-AMR define audio encoding.

Conventional video encoding techniques used in the main current video codecs (MPEG2, H263, MPEG4, H264 etc. . . . ) are described in Iain E. G. Richardson: *H.264 and MPEG-4 Video Compression*. John Wiley & Sons Ltd., 2003 ISBN 0-470-84837-5.

An example of a typical video encoder is illustrated in FIG. 10. In this coding system the data to be encoded arrive at the encoder in the form of a sequence of images regularly spaced in time (step PE1). Each image is in the YUV format. The YUV standard is a video data color representation model. If the sequence of images is in another format, RGB for example, then a conversion to the YUV format can be performed.

The images are then cut up into "macroblocks" during a block partitioning step PE2. Each standard defines the size and the format of these macroblocks. In the case of the H263 standard for example, each image is first divided into blocks of 8×8 pixels. The YUV format defines Y for each pixel in the image, but U and V are averaged over 4 pixels. The Y parameter represents luminance, while U and V allow chrominance, or color information, to be represented. The blocks are grouped into macroblocks combining 4 Y blocks, 1 U block and 1 V block. Thus in this case a macroblock contains all the information relating to a 16×16 pixel area of the image.

In a DCT (Discrete Cosine Transform) conversion step PE3, for each macroblock, each block making up the macroblock is transformed using a 2-dimensional discrete cosine transform.

The DCT transformation step PE3 is followed by a quantization step PE4. This step consists of reducing the number of bits used to code each coefficient resulting from the DCT transformation. The greater the quantization, the greater the loss of quality of the transmitted image.

The entropic encoding step PE5 is a compression step without loss of information. Each standard defines the selected algorithm. The two most used entropic coding techniques are the variable length altered Huffman code method and arithmetic coding. Entropic coding is used to compress the quantified coefficients, the motion vectors, the quantization levels and various information allowing the format and type of image transmitted to be described.

Next, in a transmission step PE6, the stream of video data obtained is transmitted within a channel previously opened within an H324m connection.

An inverse quantization step PE7 is the inverse operation of the quantization PE4. An inverse DCT transformation step PE8 is the inverse operation of the DCT transformation.

In a differential estimation phase PE9, when a macroblock is encoded in differential mode, a difference is computed between the current image and the previously sent image, just as for decoding. That is the reason for which an inverse quantization and an inverse DCT transformation are carried out. To reduce the quantity of information to be transmitted, a translation vector is applied to the macroblock of the preceding image in order to have it approximate as well as possible the current image. The search for this vector is called a "motion vector search". This difference is then transformed, quantized and then encoded.

In a throughput measurement phase PE10 for the stream leaving the coder before being transmitted over a limited throughput communication channel, the size of each encoded image is evaluated.

The encoder monitor PE11 constitutes the core of the encoder. This function checks the encoder parameters such as quantization level, the selection of absolute or differential encoding for the image, and for each of the macroblocks.

The function that uses the most resources in this type of coder is the estimation of motion vectors from the images in the input sequence. Numerous publications and patents propose a great variety of algorithms to allow the computing power used by this function to be reduced. Some algorithms have better performance in specific environments. In the context of video encoding this kind of encoder has several disadvantages:

The encoder must constantly evaluate, based on the sequence of images presented to it, pixel by pixel, the areas which must be coded differentially or absolutely, as well as the appropriate motion vectors allowing the image quality—data throughput ratio to be maximized.

A strategy for improving the rendering of static images consists for example of reducing the quantization factor and the number of images encoded per unit of time and keeping these parameters constant.

This can be done only after a sequence of n images has been identified as identical. Either a systematic delay of n images is added, which harms the responsiveness of the application, or these first n images are encoded with the conventional feedback loop and the transition to the "static image" mode will be visible in the encoded sequence.

In the case of sequences based on synthetic images, the use of the information used during the synthesis of the images has been proposed for guiding the motion search algorithm. Certain authors propose new models describing the movement by pixel or by blocks of pixels of the image; others propose to use this information within the scope of a standard video coding such as MPEG.

These articles describe systems for synthesizing "realistic" images. Each surface is represented by 3-dimensional polygons to which 2-dimensional textures are applied. Various projection and shading algorithms are used to convert these descriptions into 2-dimensional images.

However, such a model is not suited to the description of 2-dimensional user interfaces. Nor is it suited to video compression: complex algorithms are needed for evaluating the movement of each pixel in 2 dimensions from the location and movements of each polygon.

Another drawback often encountered in this field is that the size of screens in mobile telephones is often of small size. U.S. Pat. No. 6,288,704 describes a system allowing the display on a small sized screen of a larger virtual image by detecting the screen's movement using images acquired by a built-in camera. In the case of a mobile telephone, this system has the drawback of having to install an application on the telephone that requires considerable computing power needed for motion detection calculations.

In the context of putting audiovisual sequences on-line that were filmed in a mobile situation the main providers of this type of service such as YouTube or DailyMotion use the HTTP protocol to upload a video sequence present on a personal computer to their servers. In most cases the user will have first used a video camera to collect the sequence to be broadcast, captured the sequence on his personal computer, then compressed the sequence into one of the formats supported by the service provider. Once the audiovisual sequence is uploaded to the broadcast service, the user can communicate the automatically generated URL to persons to whom he will want to broadcast this sequence. To that end he can communicate this URL to his friends through an email or a social network message such as Twitter or Facebook.

Thus many steps are required for the user to put his content on-line. This can discourage users and limit the use of the service to sequences whose recording was premeditated. Further, the viewing of the sequences by the public is delayed because of the steps of transferring from the camera to the personal computer, then uploading. There is therefore no real-time broadcasting.

The invention, in at least one embodiment, has the object of mitigating at least one of these different drawbacks of the state of the art and to bring about improvements.

A first aspect of the invention proposes a process for modeling a display coming from an application on a server, the display being destined for a remote terminal; characterized in that the display is modeled to compose an image based on display information coming from the application by means of stacked layers, each layer consisting of layer pixels and being associated with a first corresponding alteration data set, the layer pixels being grouped into blocks of layer pixels, each layer pixel being characterized by a transparency factor Ttp of said pixel; the first alteration data set comprising for each layer a motion vector of said layer and transparency data of said layer, the resulting image consisting of image pixels and being associated with a second alteration data set, the image pixels being grouped into macroblocks, the second alteration data set indicating whether the image macroblocks have been altered due to alteration of the layers by the application, the image pixels consisting of the stacked corresponding pixels of the layers; the process comprising the following steps: alteration of the content of the layer pixels of at least one layer by at least one primitive according to the display information received from the application; alteration of the first alteration data set for at least one layer according to the alterations carried out by the primitive(s); alteration of the second data set according to the first data set; composition of an image based on the layer pixels, the transparency data corresponding to a block of one layer affecting a macroblock of the composite image being used to determine whether said macroblock of the image was altered with respect to the macroblock of the preceding image; and transmission to an encoder of the image to be encoded and of encoding information according to the second set of alteration data.

This modeling process allows the elements of an image such as a user interface to be simply described, and makes it possible to generate a compressed video stream from the descriptive elements of the model with few calculations. This method thus allows the calculations needed for encoding the video stream to be minimized, and also allows simplification of the composition of the images.

The first set of alteration data can include the layer's motion vectors, a transparency factor and/or, for each block of pixels of the layer, whether said block has been altered by the application, and/or whether it is completely transparent, completely opaque or neither. The combination of the motion vectors and the transparency factors of stacked layers allows the motion vectors used for the composite image to be calculated without resorting to a motion vector search based on successively composed images.

The second alteration data set can indicate a motion vector for each macroblock of pixels of the image for use in differential encoding. The pixels of the image are grouped into macroblocks. The pixels of a layer are grouped into blocks.

The transparency data of a layer can include a transparency factor of said layer and a transparency indication for each block of said layer, the transparency indication indicating whether said block is completely transparent, completely opaque or neither. The first alteration data set can also include alteration data indicating for each block of pixels of said layer whether said block has been altered by the application.

The step of modifying the second alteration data set can include, for each macroblock of pixels of the image to be encoded, a search within the first data set for the blocks of pixels of the layers affecting the macroblock which have been altered by the application, in order to determine whether the macroblock of pixels of the image to be encoded has been altered.

In one embodiment of the invention, if the first alteration data set indicates that a block of a layer affecting a macroblock of the composite image has been altered by the application, or if said block of the layer is not totally transparent and the layer to which it belongs undergoes movement, or if the transparency factor of said layer indicates that the layer is undergoing a change of transparency, then the image macroblock is recomposed.

The second alteration data set can include a motion vector for each macroblock of pixels of the image for use in differential encoding, the motion vector being determined based on the displacement vectors of the layers of which at least one block has induced in alteration of said macroblock.

In one embodiment of the invention, if several layers used to compose the image have undergone simultaneous translation, the displacement vector Vd for the encoding is selected from among the displacement vectors of the layers that have undergone a translation according to a predetermined criterion.

The second alteration data set can include, for each macroblock of pixels, whether said macroblock was altered from the preceding image, and in which only the altered macroblocks are then encoded by the encoder.

Preferably, each layer $C_i$ can be characterized by a two-dimensional displacement vector $V_d$ and/or a transparency scalar $S_{tc}$ defining a transparency for the entire said layer $C_i$.

If several layers used for composing the image have undergone simultaneous translation, the vector $V_d$ for encoding can be selected according to a predetermined criterion.

The invention also proposes an encoding method for an image, the method including reception of an image and of encoding information for encoding the image, the image and the encoding information being generated by the modeling process according to the first aspect of the invention and the encoding of the image using the encoding information.

In one embodiment each macroblock is encoded in the regular way in intracall mode for transmission to the terminal to compensate for the packet loss connected with the wireless connection.

The invention also proposes a modeling device for a display coming from an application on a server, the display being destined for a remote terminal; characterized in that: the display is modeled to compose an image according to display information coming from the application, by means of stacked layers, each layer consisting of layer pixels and being associated with a corresponding first alteration data set, the layer pixels being grouped into blocks of layer pixels, each layer pixel being characterized by a transparency factor Ttp of said pixel; the first alteration data set comprising, for each layer, a motion vector of said layer and transparency data of said layer, the resulting image consisting of image pixels and being associated with a second alteration data set, the second alteration data set indicating whether the macroblocks of the image were altered due to the alterations of the layers by the application, the image pixels consisting of stacked corresponding pixels of the layers; the device comprising: means for modifying the content of at least one layer by at least one primitive according to the display information received from the application; means for modifying the first alteration data set for at least one layer according to alterations made by the primitive(s); means for modifying the second alteration data set according to the first data set; means for composing an image based on the content of the layers, the transparency data corresponding to a block of a layer affecting a macroblock of the composite image being used to determine whether said macroblock of the image was altered with respect to the preceding image; and means for transmitting to an encoder the image to be encoded and encoding information in compliance with the second alteration data set.

The invention further proposes an encoder designed to receive an image generated by the method according to an embodiment of the first aspect of the invention and encoding information generated by the method according to an embodiment of the first aspect of the invention, the encoder being designed to encode the image using the encoding information.

The encoder can be designed to encode each macroblock of the image in the regular way in intracall mode for transmission to the terminal.

A second aspect of the invention proposes a method for exchanging data between an application executing on a server and a remote terminal, the process comprising the following steps: reception by a server, through a wireless audiovisual connection, of a request for data by a remote terminal; generation of data according to the request by an application executing on the server; generation of audiovisual data based on the data generated by the application; and transmission of the audiovisual data to the terminal through the audiovisual connection; reception at the server from the terminal of the application interaction data in the form of audio and/or video data and monitoring of the application according to the interaction data.

The data exchange request or initialization can be in the form of a video call, an audio call, a message, etc. In the context of the invention, the term audiovisual connection is considered to mean a telecommunication channel between two entities allowing the simultaneous transmission of audio and video content in real time. By the term "request" is meant an indication of an initialization of data exchange.

Thus the execution speed of the application is not limited by the computing power and the memory available on the terminal. The application can consume a great quantity of server resources without compromising the battery life of the terminal. The resources consumed include the bandwidth that can be used for communicating with other services. Further, access to the application on the server is simpler and faster. It is only necessary to make a video call. No additional software needs to be downloaded or installed on the terminal. The broadcast of audiovisual sequences is simpler and more instantaneous.

The data generated by the application can be converted into audiovisual data.

The audiovisual data can be retrieved from a database based on the data generated by the application. The server can generate display data to present a user interface on the terminal screen to allow the terminal user to interact with the application.

An image of the user interface can be transmitted to the terminal through the audiovisual connection of the H324m protocol.

The server can generate display data for presenting a user interface on the terminal screen to allow the terminal user to interact with the application.

The motion vectors Vm calculated by an encoding module of the terminal for compressing the video sequence can be received by the server and used for estimating the movements of the terminal.

The invention further proposes a method of interaction of a terminal with an application executing on a remote server comprising the following steps: transmission from a terminal to a remote server, through a wireless audiovisual connection, of a request for information; reception at the terminal, through the audiovisual connection, of the audiovisual display data according to the request; display of a user interface on the terminal screen according to the audiovisual data received; use of the user interface for interacting with the application from the terminal through the audiovisual connection for receiving the desired information, characterized in that the terminal sends interaction data to the application in the form of audio and/or video data.

The terminal can generate DTMF signals to send to the server for interacting with the application. The terminal can send interaction data to the application in the form of audio and/or video data, for example, voice commands, visual gestures, a Bluetooth index . . . .

The invention further proposes an application server comprising: an application module for execution of an application accessible from a remote terminal; reception means for receiving, through a wireless audiovisual connection, a request for data from a remote terminal; means for generating data according to the request; means for providing the audiovisual data based on the data generated by the application; means for transmitting the audiovisual data to the terminal through the audiovisual connection; reception means capable of receiving, from the terminal, application interaction data in the form of audio and/or video data; and monitoring means for monitoring the application according to the interaction data.

The invention also proposes a mobile terminal capable of interacting with an application executing on a remote server, the terminal comprising transmission means for transmitting to a remote server, through a wireless audiovisual connection, a request for information; reception means for receiving, through the wireless audiovisual connection, audiovisual display data according to the request; a screen for displaying a user interface according to the audiovisual data received; means for using the user interface for interacting with the application from the terminal through the audiovisual connection to receive the desired data; means for transmitting application interaction data to the server in the form of audio and/or video data.

A third aspect of the invention proposes a method for a user of a mobile terminal to navigate within an application executing on a remote server, the process comprising the following steps: display of a user interface on a screen of the terminal according to the display data received from the server; detection of the movement of a positioning device mounted on the user in response to the content of the display on the terminal screen for determining the navigation data of the user within the application, the positioning device being movable independently of the terminal; modulation of the movement data in audio format for transmission to the server through an audio channel; and reception, from the server, of the display data according to the movement data.

This gives the user the possibility of interacting more precisely with the application executing on the server. What is more, the method does not require downloading additional software to be used because the method uses an existing profile of the Bluetooth standard.

Advantageously, the positioning device can be designed to communicate with the terminal through a Bluetooth type connection.

The display information is received from the server through an audiovisual connection. The connection can be an audiovisual link according to the H324m protocol.

The modulation step can include a robust modulation step with respect to Bluetooth code conversion into H324m audio.

The invention also proposes a method for processing the navigation data of a user on a mobile terminal in an application on a remote server, the method comprising the following steps: reception at the server, through a telecommunication link, of the movement data of a positioning device of the terminal that is movable according to the movements of the user;
processing of the movement data to determine application navigation data according to the movement data, and transmission to the terminal of the display data according to the movement data.

The movement data can be received through an audio channel.

Advantageously, the server can detect the presence of the positioning device by detection of a carrier or of a predefined sequence through the audio channel.

The invention also proposes a mobile device capable of communicating through a wireless connection with an application executing on a remote server, the device comprising: a terminal handset comprising a screen for displaying a user interface produced by the application and a keyboard, a positioning device movable according to the movements of the user independently of the movements of the handset and capable of communicating with the handset through a wireless intermediary; means for generating movement data according to the displacement of the positioning device; and a modulator for modulating the movement data in audio format for transmitting them to the server through an audio channel; means for receiving, from the server, display data according to the movement data.

Preferably the handset can include a Bluetooth interface, and the positioning device can include a Bluetooth radio for communicating with the Bluetooth interface.

The positioning device can include an accelerometer or a mouse.

The invention also proposes an application server comprising an application module for executing at least one application; a demodulator for demodulating the movement data received through an audio channel from a mobile terminal; and a movement data processing module for determining application navigation data according to the movement data and for determining display data for the terminal according to the navigation data.

The server can be equipped with means for detecting the presence of a positioning device.

A fourth aspect of the invention proposes a method for putting audio and/or video data on-line, the process comprising the following steps: capture of the video and/or audio data by a remote terminal; transmission of the video and/or audio data to a remote server through a wireless audiovisual connection, recording the video and/or audio data on the server; code conversion on the server of the video and/or audio data to a format compatible with a personal computer; and transmission of the converted data from the server to an online audiovisual sequence broadcasting service, the broadcasting of the audiovisual sequence corresponding to the video and/or audio data being monitorable through the wireless audiovisual connection.

This method offers the user of a terminal a simple and fast means of putting on-line audiovisual sequences filmed in a mobile setting.

The method can also include a step for generating a display for the terminal allowing control over the start and the end of the recording and/or for giving a name to the sequence.

The method can also include a step for recording an identification element for the terminal such as a terminal number to create a link between the recorded sequence and the user who created it.

The method can also include a step of creating a unique random URL providing a pointer to these video and/or audio data transmitted to the broadcasting service.

The method can also include a step of sending, to a personal account on a social networking site on the Web, a message containing the unique random URL allowing access to the audiovisual sequence.

The invention also proposes a server comprising a recording module for recording the video and/or audio data received from a remote terminal through a wireless audiovisual connection, a conversion module for converting the video and/or audio data to a format readable by an audiovisual data reproducer of the PC type, means for transmitting the converted data to an online broadcasting service, the broadcasting of the audiovisual sequence corresponding to the video and/or audio data being monitorable through the wireless audiovisual connection.

The server can be equipped with a display generation module for generating a display destined for the terminal allowing the user to control the start and end of the recording and/or to give a name to the sequence.

The server can also include a database to record the number of the terminal to create a link between the recorded sequence and the user who created it.

The server can also include a pointing module for creating a unique random URL providing a pointer to these video and/or audio data transmitted to the broadcasting service.

The server can include a sending module for sending to a personal account on a social networking site on the Web a message containing the unique random URL allowing access to the audiovisual sequence.

The server can include a broadcasting module for broadcasting audiovisual sequences online.

The server can also include a database in which user data are stored, including data identifying at least one social networking account and/or broadcasting service account to which the user subscribes.

A fifth aspect of the invention proposes a mobile terminal user navigation method in an application executing on a remote server, the method comprising the following steps: reception of the motion vectors of the video data, the motion vectors having been calculated for the compression of a video sequence by a terminal; estimation of the movement of the terminal based on the motion vectors for obtaining instructions for user navigation in the application based on the estimated movement; composition of the content to be displayed on the terminal according to the navigation instructions to allow navigation in a user interface with a size larger than the size of the terminal screen.

This method makes it possible to visualize on a small screen a virtual image that is larger than the screen or to switch from one image to another without heavy additional calculations in the handset or on the server. A movement to the right of the handset can, for example, mean switching to the following image in the case of viewing a photo album. The movement of the handset can be used to move a pointer on the screen (like a mouse on the computer).

The display content can be transmitted from the server to the terminal through an audiovisual connection. The audiovisual connection can be an H324m protocol connection.

The invention also proposes a navigation process for a user of a mobile terminal in an application executing on a remote server, the process comprising the following steps: moving the terminal to navigate within the application; calculation of the motion vectors of the video data, the motion vectors being linked to the displacement of the terminal by the user; transmission of the motion vectors to the server as application navigation instructions; and reception of the content to be displayed on the terminal according to the navigation instructions, the navigation instructions being determined according to the motion vectors to allow navigation in a user interface image larger than the size of the terminal screen.

The invention also proposes an application server comprising: an application module for executing at least one application, a decoder for receiving motion vectors from video data, the motion vectors having been calculated for the compression of a video sequence transmitted from a terminal; a processing module for estimating the movement of the terminal based on the motion vectors for obtaining navigation instructions from the application user according to the estimated movement and for generating content to be displayed on the terminal according to the estimated movement to allow navigation in a user interface image larger than the size of the terminal screen.

Each aspect of the present invention proposes a software program for the implementation of the corresponding method described earlier. Such a program can be downloadable via a telecommunication network and/or stored in memory in a processing device and/or stored on a memory medium designed to cooperate with a processing device.

DESCRIPTION OF THE FIGURES

Other features and advantages of the invention will appear upon examination of the detailed description that follows, and of the appended drawings in which:

FIG. 3B illustrates the terminal and the server of FIG. 3A;

FIG. 8A through 8C show schematically a server and a terminal according to a fourth embodiment of the invention;

FIGS. 9A and 9B show schematically a server and a terminal according to a fifth embodiment of the invention.

The modules shown in the different figures are functional units, which may or may not correspond to physically distinguishable units. For example, these modules, or some of them, can be grouped into a single component, or constitute functionalities of a single program. Contrarily, certain modules can possibly be made up of separate physical entities.

DETAILED DESCRIPTION

Figure 1:
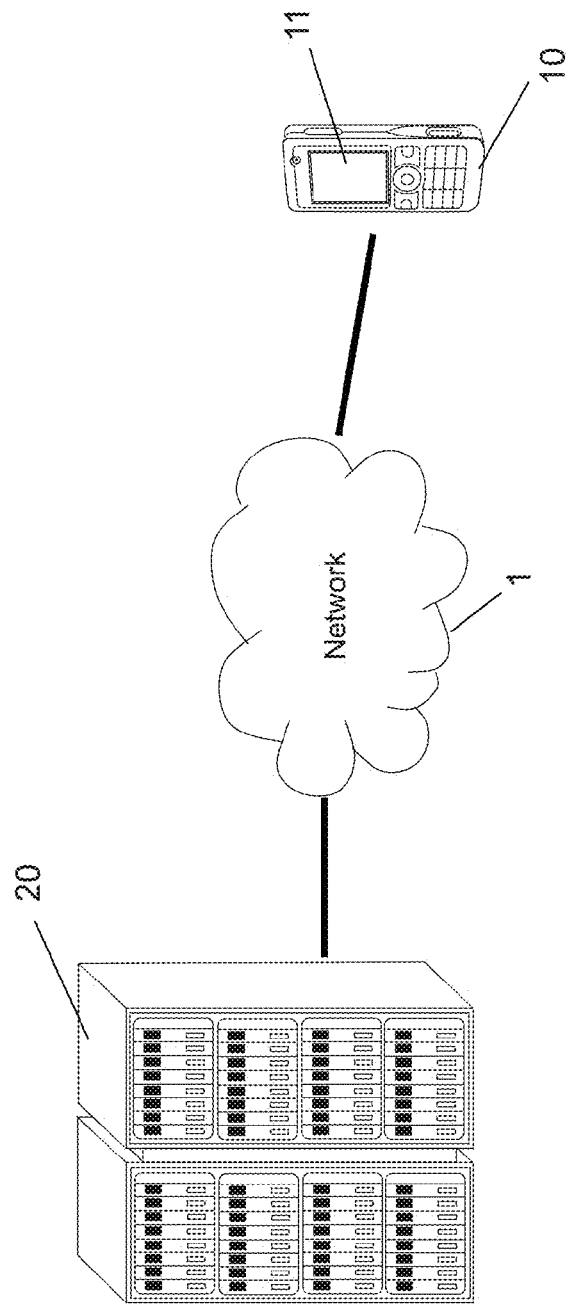
FIG. 1 illustrates schematically a telecommunication system according to at least one embodiment of the invention.

FIG. 1 shows schematically a telecommunication system in which a user terminal 10 in a mobile setting has access through a GSM 3G (abbreviation of Global System of Mobile Communications, Third Generation) type network 1 to a remote application server 20 on which at least one application is executing. Of course, the invention is not limited to such a network. Thus for example the network could be any kind of telecommunication network allowing the establishment of an audiovisual connection. The mobile terminal 10 can be a portable telephone, a PDA, a portable computer, etc.

The application on the server 20 allows the user to gain access to information in real time (such as weather reports, stock quotations . . . ), including personal information (such as the balance in a bank account, an album of personal photographs . . . ) and multimedia (such as videos for example). A video interface produced by the application is displayed in the form of graphic elements (titles, text, images . . . ) on the screen 11 of the terminal 10 and allows the user to interact with the application. The terminal 10 is equipped with a decoder for decoding the video stream sent by the application of the server 20 for displaying the user interface on the screen 11 of the terminal 10. The terminal 10 can be equipped with a video encoder for transmitting video data to the server.

Figure 2A:
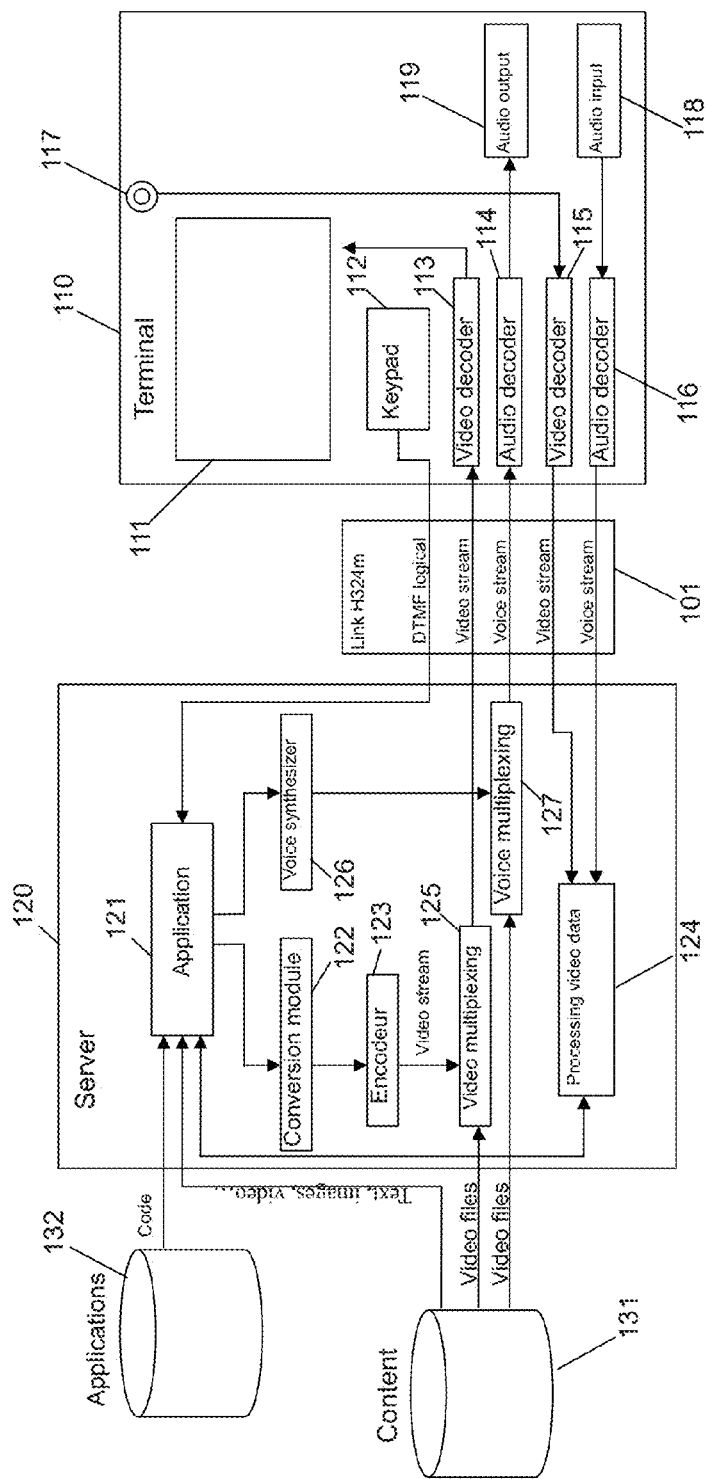
FIG. 2A shows schematically a server and a terminal according to the first embodiment of the invention.

Refer now to FIG. 2A in which is illustrated a first embodiment of the invention. In this example a bidirectional multimedia connection 101 provided by an audiovisual call available on the 3G network using the h324m protocol is used by a terminal 110 for interacting with the application executing on the remote server 120 of the terminal 110.

In this example the terminal 110 is a portable telephone of the 3G visiophone type. The terminal 110 includes a screen 111 on which will be displayed a user interface provided by the server 120, the keys of the keypad 112, a video decoder 113 for decoding video data received from the server 120, an audio decoder 114 for decoding audio data received from the server 120, a video encoder 115 for encoding video data, and an audio encoder 116 for encoding audio data, a camera 117 for capturing sequences of images, means 118 for generating an audio stream, for example a microphone or a Bluetooth headset, and means 119, a speaker for example, for reproducing audio data.

The keys of keypad 112 are capable of generating logical DTMF signals within an H324m session.

Figure 10:
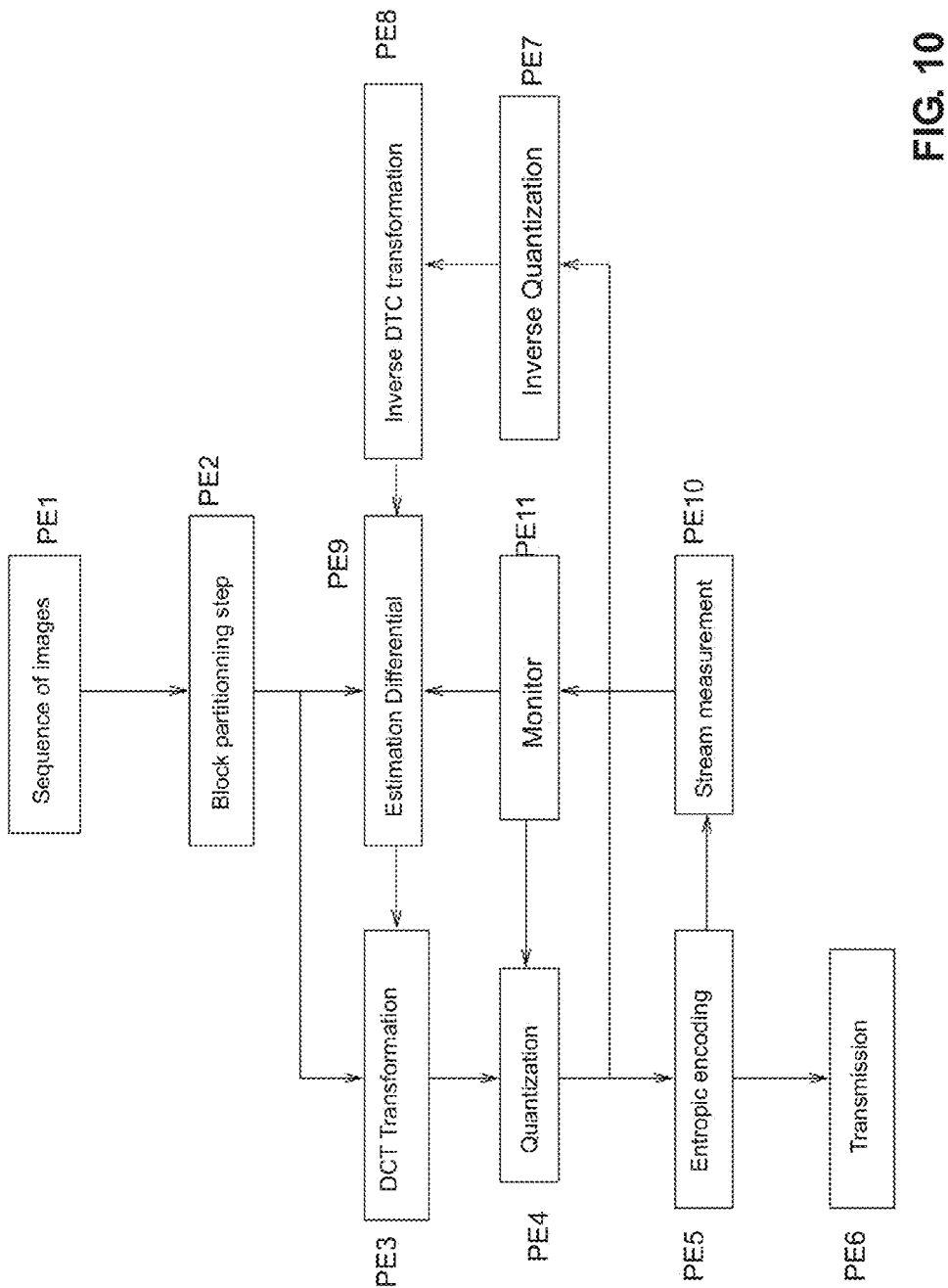
FIG. 10 shows schematically a conventional encoder.

The server 120 is equipped with an application module 121 where the application executes, a conversion module 122 comprising software allowing a processor to generate an audio and/or video stream, in real time, from data generated by the application and an encoder 123 for encoding the audio and/or video stream generated by the conversion module 122. The encoder 123 can be an H 264 type video encoder as illustrated in FIG. 10 for example, or some other type of encoder presented in Iain E. G. Richardson: *H.264 and MPEG-4 Video Compression*. John Wiley & Sons Ltd., 2003 ISBN 0-470-84837.5. In one embodiment, the server 20 can be equipped with a modeling module and an encoder as described for the third embodiment of the invention.

The application module 121, the conversion module 122 and/or the encoder 123 are for example embodied by programs executed on one or more processors. Of course, the modules of the server can be distinct modules as illustrated in FIG. 2A or can be part of one or more integrated modules.

The server 120 also includes means 124 for managing the incoming streams for receiving and processing audio data transmitted by the terminal 110 and for receiving and processing video data transmitted by the terminal 110. The means 124 for receiving and processing audio data received from the terminal 100 can include a voice recognition device for example and/or an audio recording device. The means 124 for processing video data received from the terminal 110 can include an enhanced reality device. By an enhanced reality device is meant a device which makes possible the superposition of a virtual 3D or 2D model onto the perception of reality that we have naturally, and does this in real time. This device can apply just as well to visual perception (superposition of a virtual image on real images) as to proprioceptive perceptions such as tactile or auditory perception. The means 124 for processing video data received from the terminal 110 can include, additionally or as a variation, a shape recognition device and/or a video recording device.

The server 120 has access to an applications database 132 and a content database 131. The application module 121 can retrieve audio and video files in the content database according to the application data for transmitting them to the terminal 110.

The server is also equipped with a voice synthesis module 126 for generating audio data to be transmitted to the terminal based on the data received from the application module 121.

The server 120 is equipped with a video multiplexing module 125 for managing video data received from the content database 131 or from the encoder 123, and an audio multiplexing module for managing the audio data received from the voice synthesizer module 126 or from the content database 131.

As illustrated in FIG. 2A, the user of the terminal 110 can interact with the application on the application module 121 of the remote server through DTMF signals generated by the keys of the keypad 112 of the telephone; the audio stream of the uplink of the audio input 118; and/or the video stream of the uplink of the camera 117.

Figure 2B:
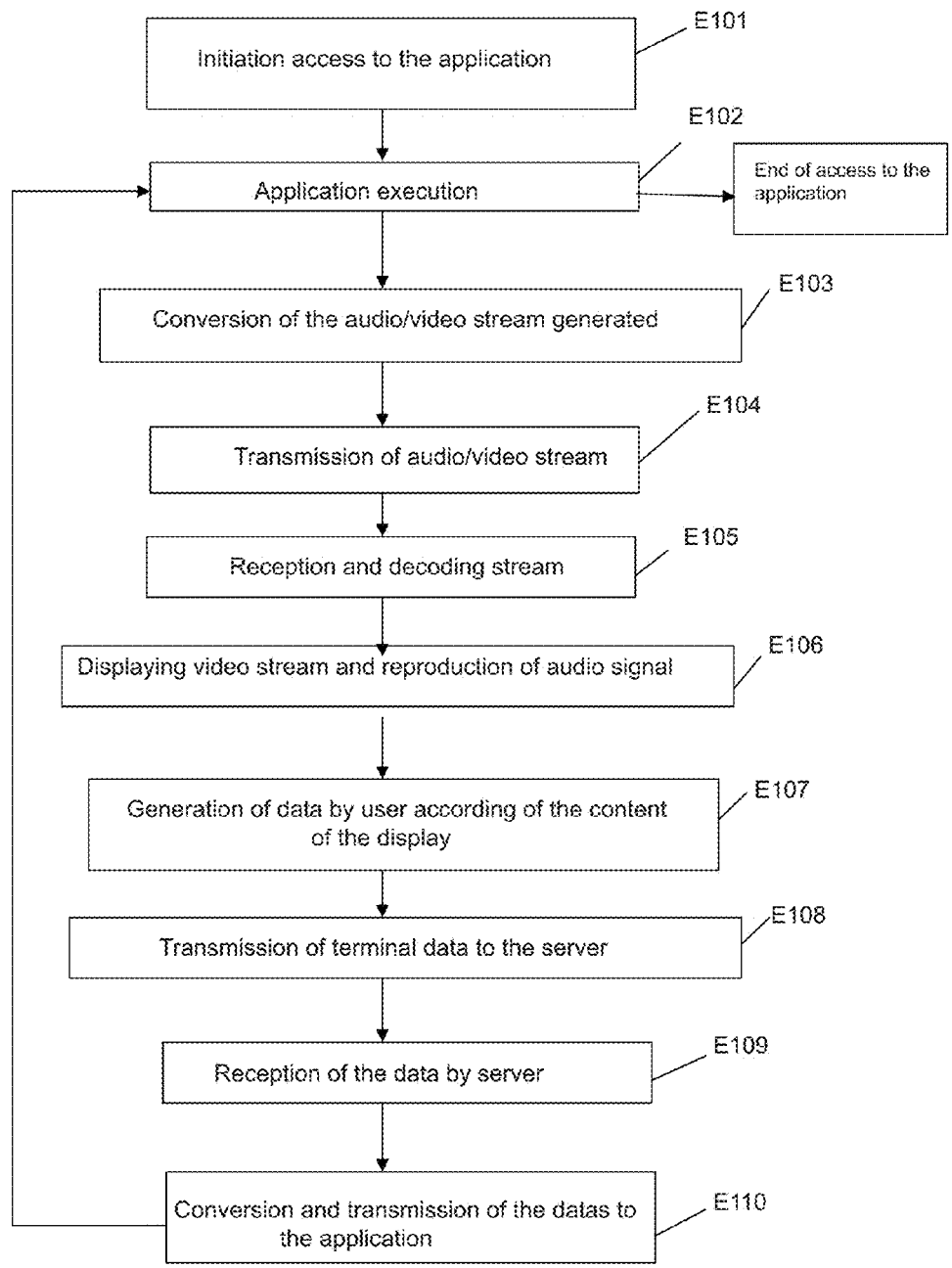
FIG. 2B illustrates the steps in a method for exchanging data between a terminal and a server according to the first embodiment of the invention.

FIG. 2B shows a flowchart of the data exchange process between the terminal 110 and the server 120. In a step E101, the user of the terminal 110 makes an audio or video call to initiate access to the application on the application module 121 of the server 120 to view information, as for example the weather report.

In a step E102 the application generates data for a first display on the screen 111 of the terminal 110 in response to the call from the terminal 110. In the case of viewing the weather report for example, the display generated by the application could be a map of France to allow the user to select a region of interest. The data generated by the application 121 are then transmitted from the application module 121 to the conversion module 122 to convert them into a video stream in a step E103. Alternatively, the application can retrieve the audiovisual data from the content database 131, or can generate audio data from the voice synthesis module in response to the call from the terminal 110.

In a step E104 the video stream is encoded by the encoder 123 and the encoded stream is sent to the terminal 110 by the audiovisual connection. The data stored in the database 131 can already be in an encoded format.

The terminal 110 receives the encoded video stream in a step E105 and decodes it using the decoder 112. In a step E106 an image of the map of France is displayed on the screen 111.

In a step E107 the user of the terminal 110 uses the keys in the keypad 113 to select a region of the map displayed on the screen 111 and thus generates data based on the content of the display. The DTMF signals generated by the keys in the keypad 112 are then transmitted by the audiovisual connection to the server 120 in a step E108. The signals are received by the server 120 and processed by a DTMF processing module 126 of the server 120 in a step E109. The data corresponding to the DTMF signals are then transmitted to the application module 121 in a step E110 in a format usable by the application. The application processes the data and the process can continue with the exchange of data through the audiovisual connection between the terminal 110 and the server 120.

The user can also provide interface data in audio form (with his voice for example) or in video form (by transmitting an image or a recorded sequence of images for example).

The advantages of this solution are many:

Interoperability is guaranteed by the initial application of the H324m protocol: audiovisual communication between the server 120 and the terminal 110. This requires a scrupulous observance of the H324m protocol as well as the audio and video compression standards.

The rendering on the screen 111 of the terminal 110 is guaranteed by the fact that a video image is transmitted "to within a pixel," and that the size of the image is negotiated upon initialization of the H324m session.

The execution speed of the application is not limited by the computing power and the memory available on the terminal 110. The application can consume a large quantity of resources on the server 120 without compromising the battery life of the terminal 110. The resources consumed include the bandwidth that can be used for communicating with other services.

Access to the application on the server 120 is simple and quick. All that is needed is to make a video call. No additional software needs to be downloaded or installed.

Broadcasting of the audiovisual sequences is simple and instantaneous.

A second embodiment of the invention offers to give the user of a terminal in a mobile setting having access to an application on a remote server the possibility of interacting more precisely with the application running on the server.

Figure 3A:
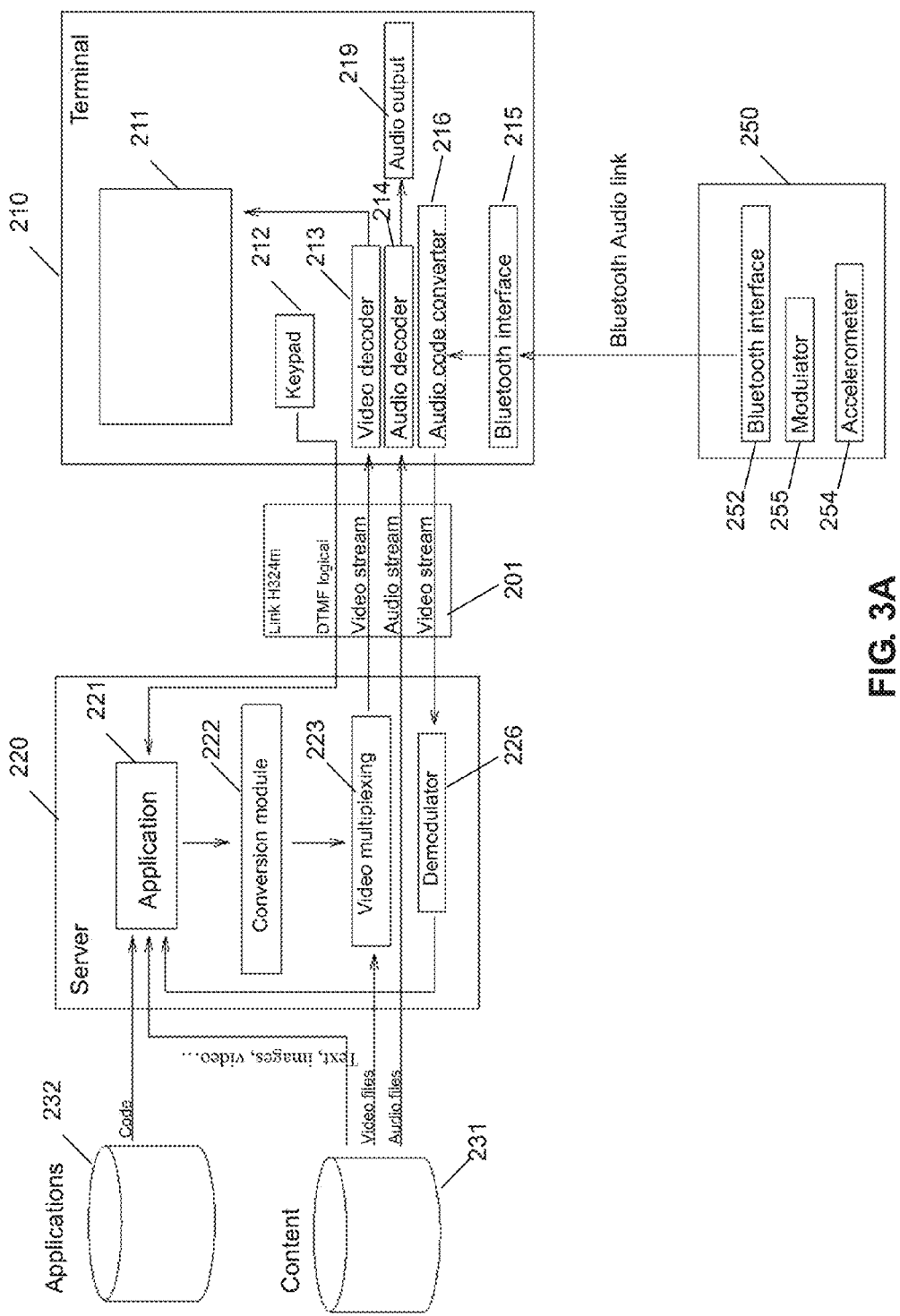
FIG. 3A shows schematically a server and a terminal according to a second embodiment of the invention.
Figure 3C:
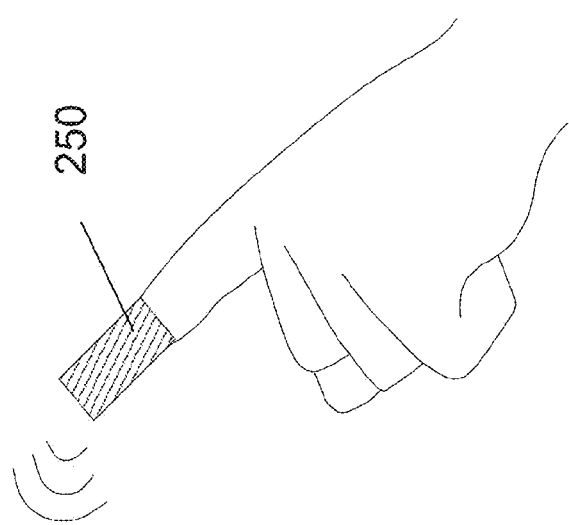
FIG. 3C illustrates a pointer according to the second embodiment of the invention.

In this example, illustrated by FIGS. 3A through 3C, the terminal 210 includes a screen 211 on which will be displayed, as in the foregoing example, a user interface for interacting with an application on a remote server 220, audio 213 and video 214 decoders for decoding the video and/or audio data received from the server 220, keys in the keypad 212, a speaker 219 for reproducing audio data and a Bluetooth interface 215 for communicating with a positioning device or pointer 250 equipped with a Bluetooth radio for navigating the application. As in the foregoing example the keypad keys 212 can be capable of generating logical DTMF signals within an H324m session. The terminal 210 can be equipped with means for generating an audio stream and means for generating a video stream as in the terminal of the foregoing example. The terminal also includes an audio code converter 216 for converting the audio data destined for the server.

This second embodiment differs from the first in that the terminal 210 is equipped with a navigation pointer 250 to provide user movement data. The pointer 250 is equipped with a processor, a Bluetooth radio 252, an electric storage battery, a positioning module 254 and a modulator 255. The positioning module 254 can be of the mouse type, or of the accelerometer type for example. The pointer 250 is built into device positioned in the hand or on the index finger of the user as illustrated in FIG. 3C.

The server 220 is equipped with an application module 221, a conversion module 222 including software allowing a processor to generate an audio and/or video stream in real time based on data generated by the application, an encoder 223 for encoding the video and/or audio stream generated by the conversion module 222 for transmission to the terminal 210; and a demodulator 226 for demodulating the data received through an audio channel. As in the foregoing embodiment, the server has access to an applications database 232 and a content database 231 for retrieving audio and/or video files for transmission to the terminal 210.

Bluetooth-equipped 3G telephones support the "Headset profile" defined in the Bluetooth standard. In normal use, during a video call, a Bluetooth headset is used to delocalize the audio functionality of the terminal to the user's head. In this second embodiment, the pointer 250 is seen by the telephone 210 as a Bluetooth headset. The movement data of the user's index finger and hence of the pointer 250 are modulated in the audio uplink channel transmitted by the pointer 250 to the terminal 220. A modulation that is robust with respect to CSV (Bluetooth) to AMR (H324m) code conversion can be carried out by the audio code converter 214 for the transmission of these data.

In the server 220, the audio data received through the audio channel are demodulated by the demodulation module 226 in order to recover the pointer 250 movement data and transmit them to the running application, in the application module 221, in the form of events. Detection of a carrier or of a predefined sequence will allow the server 220 to detect the presence of the pointer 250.

In operating mode the display information is generated by the application module 221 and is converted into an audiovisual format for transmission by the conversion module 222. The audiovisual data are encoded by the encoder 223 and sent to the terminal 210. Alternatively, the audiovisual data can be retrieved from the content database 231. The audiovisual data are then decoded by the decoder 213 and/or 214 and a user interface is displayed on the screen 211. The user moves his index finger on which the pointer 250 is mounted in response to the content of the display to navigate the application on the server 220 and to thus give instructions to the application. The movement data according to the displacement of the pointer 250 are modulated by the modulator 255 then converted from the CSV format (Bluetooth) to AMR (H324m) audio by the audio code converter 216, and are then transmitted to the server 210 through an audio channel. The demodulator 226 demodulates these movement data. The movement data are then processed by the application module 221 to recover the user's navigation instructions.

Thus the movement of the user's index finger can be used to retrieve the user's intentions or instructions regarding the application.

For example, in the case where an image larger than the terminal screen is being shown, the movements of the index finger can indicate the desired translation movement of the displayed image. Another example consists of reproducing a pointer on the screen and to interpret movements of the index finger for displacing this pointer on the screen. A specific movement of the pointer 250 can be used to move from one part of an image to another part, from one image to another, from one list to another list, from one screen to another screen, for answering yes or no etc.

Thus the user can move within the user interface to interact more precisely with the application. The pointer 250 therefore allows more intuitive navigation of the application in the user interface when the audio uplink from the terminal 210 to the server 220 is not used. Furthermore, the user can hold the terminal steady in order to view the information present on the screen of the terminal.

Advantageously, the user's index finger can be equipped with a button operable by the thumb and able to serve as a "click" (as on a mouse). Information regarding a press on this button can be appended to the acceleration data before modulation.

One advantage of this embodiment is that it does not require any software or specialized driver to be downloaded to the mobile telephone to be used because it can use an existing profile of the Bluetooth standard. Thus, it is possible to use an existing terminal without having to modify its hardware or its firmware.

Figure 4:
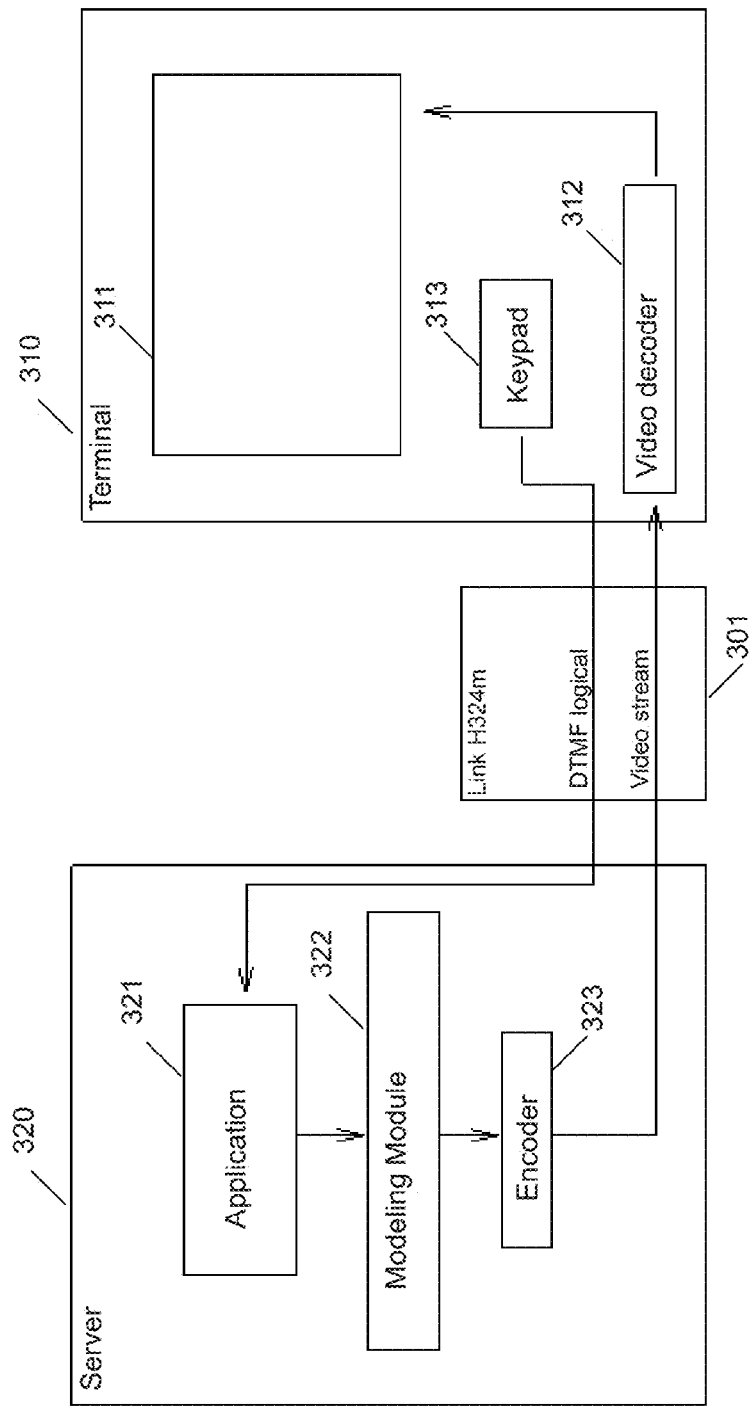
FIG. 4 shows schematically a server and a terminal according to a second embodiment of the invention.

As shown in FIG. 4, in a third embodiment of the invention the server 320 comprises an application module 321, a modeling module 322 and an encoder 323. The modeling module 321 presents a model allowing both a simple description of the elements of a user interface to be displayed on the terminal and the ability to generate with the encoder 323 a compressed video stream from the descriptive elements of the model with little calculation. This model also allows simplification of the composition of the images.

Figure 5:
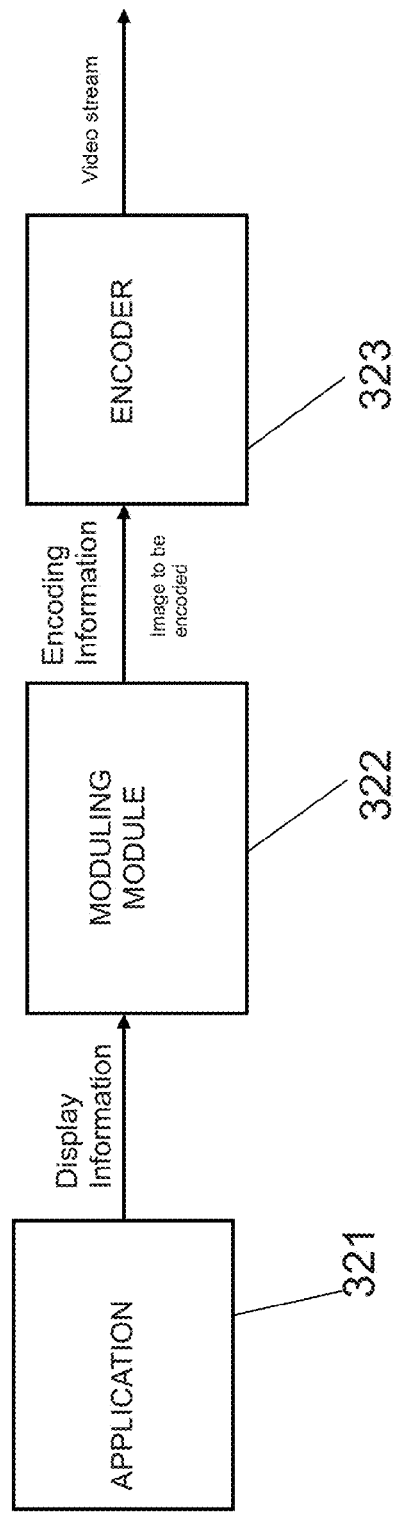
FIG. 5 shows schematically some modules of the server of FIG. 4.

As shown in FIG. 5, the modeling module 322 constitutes an interface between the application module 321 defining what must be displayed on the screen 311 and the encoder 323 which uses the information generated by the modeling module 322 to generate the video stream to be sent to the terminal 310. To this end, the modeling module 322 receives display information from the application module 321 and processes the display information so as to provide encoding information and the image to be encoded to the encoder. The encoder 323 can thus encode the image to be encoded using the encoding information. The modeling module 322 is designed so as to use a model that both allows a simple description of the complex screens and allows the encoder 323 to effectively use the information in the model during encoding.

Figure 6A:
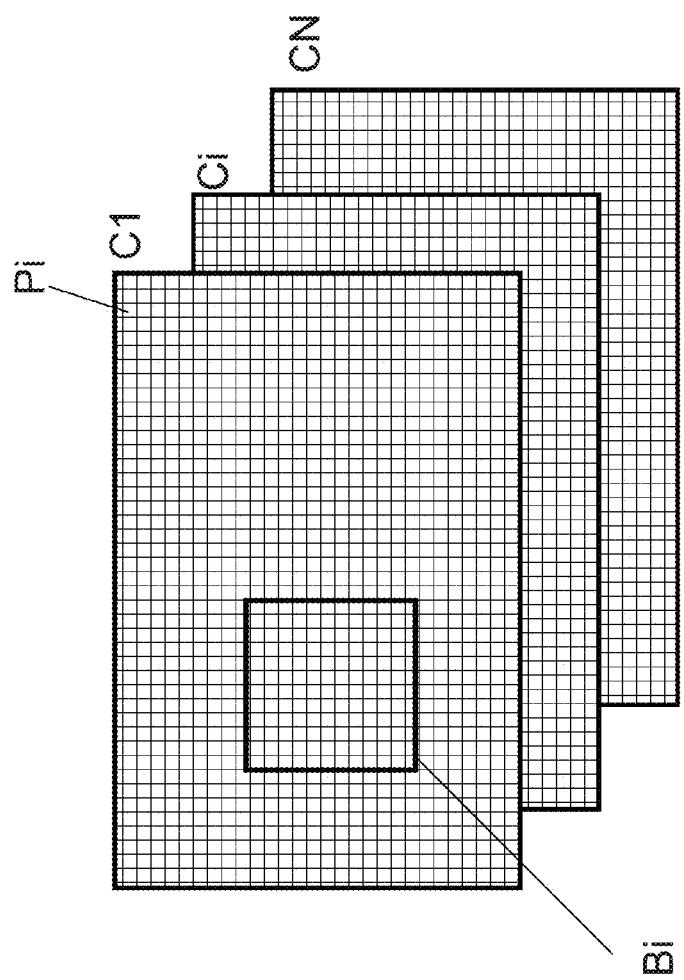
FIG. 6A shows schematically some modeling layers according to the third embodiment of the invention.

The third embodiment of the invention proposes to model the display with stacked layers ($C_1 \ldots C_i \ldots C_N$) as illustrated in FIG. 6A. Each layer $C_i$ consists of a set of M pixels ($P_1 \ldots P_i \ldots, P_M$). Each pixel $P_i$ is characterized by a four-dimensional (R, G, B, A) color vector Vc defining the color of Pixel Pi as well as its transparency. Each layer $C_i$ also has a transparency factor $F_{ti}$ defining the transparency of said layer $C_i$. N layers $C_i$ are stacked one upon the other.

This model 3221 in the form of stacked layers ($C_1 \ldots C_i \ldots C_N$) allows a convenient definition of the effects that are useful in presenting information sent from the application on the server 320 to a user of the terminal 310. For example, a background image can be drawn on the lowest layer $C_N$, and text can be drawn on the top layer $C_1$. Thus it is possible to modify the text on the layer $C_1$ and retain the background defined on the layer $C_N$ without the application being required to draw the pixels of the background image on the layer $C_N$ at each alteration of the text of layer $C_1$.

As an example, for an icon to appear progressively on the screen 311 of the terminal 310, the icon can be drawn on a layer $C_i$ above a background on layer $C_N$ for example, and the transparencies $F_{tp}$ of the pixels ($P_1 \ldots P_i \ldots, P_M$) involved can be varied.

When it is desired to make a transition between two display images on the screen 311 of the terminal 310 for example, the two images can be placed on two layers $C_i$ and $C_{i+1}$, for example, and the transparencies $F_{tp}$ of the pixels ($P_1 \ldots P_i \ldots, P_M$) of the layers in question can be varied to give a crossfade effect.

Furthermore, each layer $C_i$ has a two-dimensional displacement vector $V_d$, a scalar $S_{tc}$ defining a transparency for the entire layer as well as a table called the "layer altered block" table determining, for a block $B_i$ of pixels ($P_1 \ldots$ $P_i, \ldots, P_M$) of layer $C_i$, whether the block $B_i$ was altered by the application, whether it is totally opaque, totally transparent or neither. A block $B_i$ can consist, for example, of 8×8 pixels.

Table 1 is an example of a representation of such a table

TABLE 1

| Block # | Alteration? | Transparency |
|---------|-------------|--------------|
| 1 | Y | O |
| 2 | N | X |
| I | N | T |
| N | Y | X |

In the table, the first column identifies the blocks, the second states whether the block has been altered, yes (Y) or no (N), and the third column states whether the block is opaque (O), transparent (T) or neither (X).

Figure 6B:
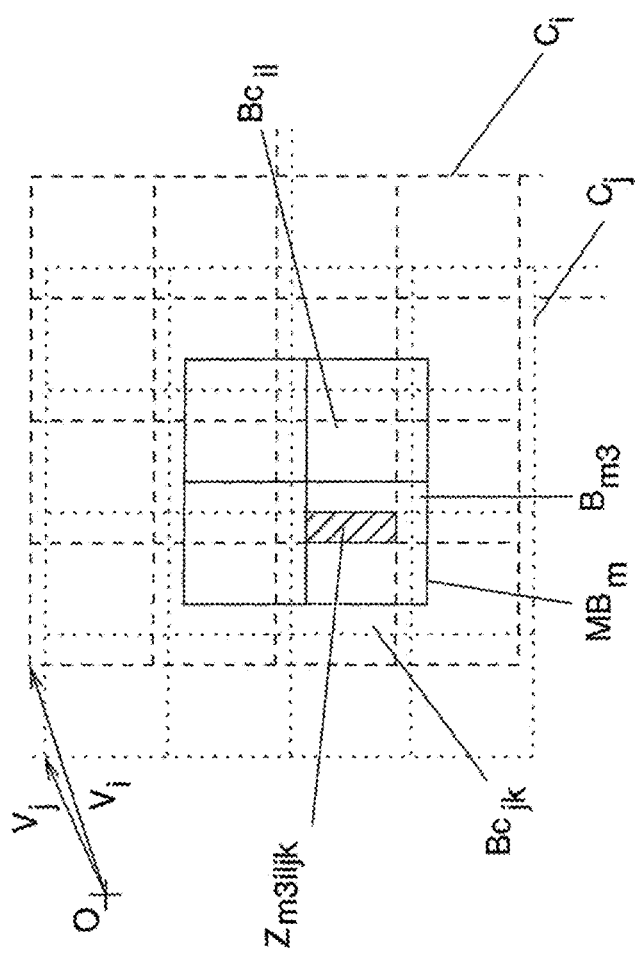
FIG. 6B shows schematically the macroblocks of an image according to the third embodiment of the invention.

A frame memory buffer 3222 represents the image to be encoded. The image to be encoded consists of pixels grouped into groups of pixels called macroblocks. A macroblock can correspond to a group of 16×16 pixels for example. In the variations, a macroblock can correspond to 16×8, 8×16 or 8×8 for example. A table is appended to it, called the macroblock alteration table, describing, for a macroblock $MB_m$ of the image composed by the model 3221, whether the macroblock $MB_m$ was altered with respect to the preceding image. A macroblock $MB_m$ consists of a number of blocks $B_{mk}$ as illustrated in FIG. 6B. The number of blocks constituting a macroblock depends on the video encoding standard used.

Table 2 is an example of such a table

TABLE 2

| Macroblock # | Alteration from the preceding image | Motion vector |
|--------------|-------------------------------------|---------------|
| 1 | Y | $V_1$ |
| 2 | N | $V_2$ |
| i | Y | $V_i$ |
| N | Y | $V_n$ |

In the table, the first column identifies the macroblocks, the second states whether the macroblock was altered, yes (Y) or no (N), from the preceding image, and the third column indicates the layers altered by the movement.

In the image an image pixel consists of a blend of the superimposed pixels of the layers by a pixel blending process with alpha or "pixel alpha blending".

An example of the composition of a macroblock is illustrated in FIG. 6B. $MB_m$ represents the macroblock m of the frame memory buffer. For the sake of simplicity, only the luminosity blocks Y are shown. $MB_m$ therefore consists of four blocks. $B_{m3}$ as the third block of macroblock $MB_m$ of the frame memory buffer.

In this example, $C_i$ represents layer i, $C_j$ represents layer j, $V_i$ represents the translation vector of layer i with respect to O, $V_j$ represents the translation vector of layer j with respect to O, O represents an origin that is fixed with respect to a frame memory buffer, $Bc_{ik}$ represents block 1 of layer i, and $Bc_{jk}$ represents block k of layer j.

$Z_{rm3iljk}$ represents the area of block $B_{m3}$ of macroblock $MB_m$ affected by blocks i of layer 1 and j of layer k. It is assumed in this example that the layer i is above the layer j, that is that an opaque area of layer i can mask off an area of layer j.

If for example, block $Bc_{il}$ is tagged as opaque and altered, then macroblock $MB_m$ will be tagged as altered. If, however, block $Bc_{il}$ is tagged as transparent, in motion, and block $Bc_{jk}$ is tagged as neither opaque nor transparent, then macroblock $MB_m$ will not be tagged as altered.

For all the areas $z_{m3xxxx}$ which affect block $B_{m3}$ of the image, the indications in the layer block alteration tables as well as the descriptions of movement and transparency of the layers allow evaluation of its contribution to the alteration of the frame memory buffer. The motion vector of macroblock $MB_m$ will be selected from among the motion vectors of the layers.

Figure 7A:
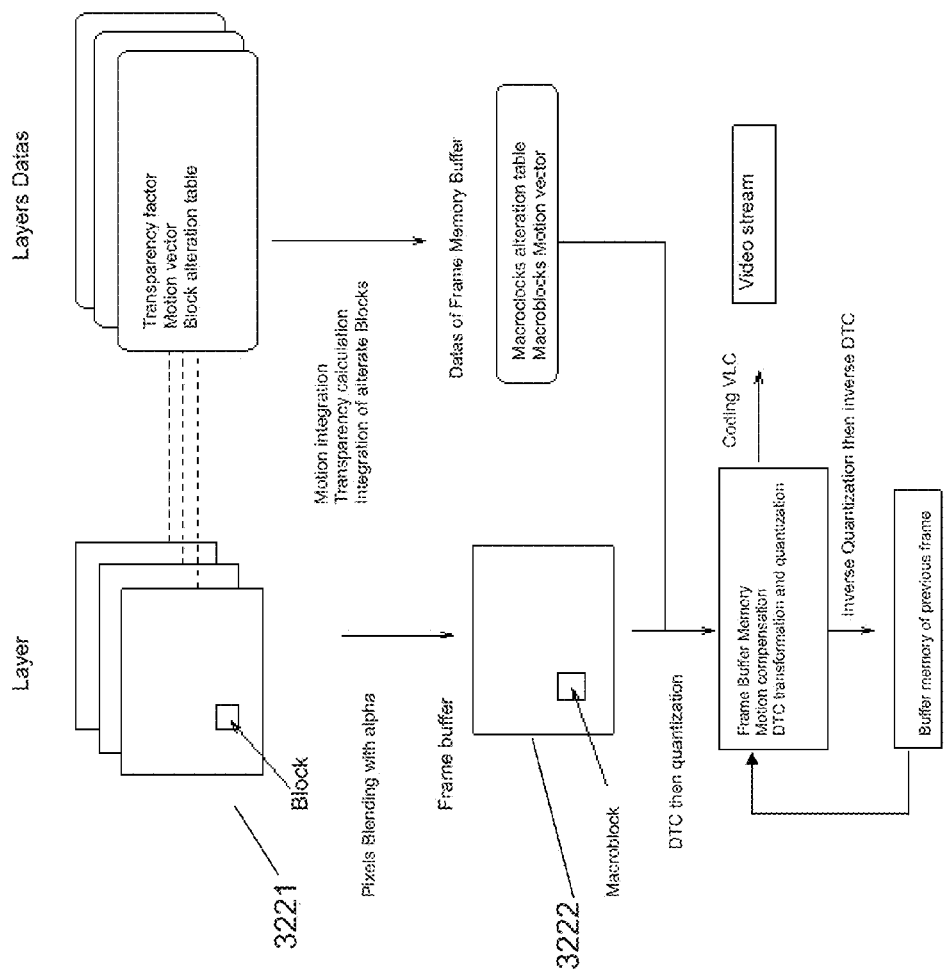
FIGS. 7A through 7C illustrate the steps in a modeling process of a display according to the third embodiment of the invention.

An example of the modeling method according to one embodiment of the invention will be described with reference to FIGS. 7a through 7c. In a first step E31 of the method the application module 321 sends display information to the modeling module 322. The display information can be in the form of the primitives.

In a step E32 the modeling module 322 can alter the content of the layers $C_i$ according to display information received using primitives. Primitives make it possible for example to copy an image to one or more layers from a png or jpeg format file, to draw a rectangle in it or to add text to it from a character font.

As an example, a "select layer" primitive allows a current layer $C_i$ to be selected, which the primitives called later will affect. Alternatively, the layer $C_i$ to which it applies can be added as a parameter to each primitive.

For example, the "rectangle" will use the following parameters:

x, y: position of the upper left corner w, h: width and height of the rectangle c: rectangle fill color This primitive will draw on the current layer $C_i$, at the position defined by the coordinates (x, y), a rectangle of width w and height h. The interior of this rectangle will be filled with the color c.

In a step E33 overlay data (transparency factor, motion vector and the block alteration table) are altered according to the action of the primitive or primitives invoked by the application. To this end, the primitives alter the layer Ci to which they apply, and alter the block alteration table according to the alterations made by the primitives. For example, the "rectangle" primitive invoked with the operational parameters x=0, y=0, w=8, h=8, c-black, alter the current layer $C_i$, and indicate in the block alteration table that the first block B1 of layer $C_i$ was altered.

In addition, it is possible, at any time and for each layer, to define a translation motion using the displacement vector $V_d$, as well as a variation of the transparency factor by means of the transparency scalar $S_{tc}$.

For example, it is possible to define a "move to" primitive to which the following parameters are transmitted:

x, y: coordinates of the final position of the layer t: translation time

This primitive moves the current layer $C_i$ from its current position to the position defined by the coordinates (x, y) in a time t given in milliseconds for example.

For each image to be encoded, for each macroblock $MB_m$ of the frame memory buffer representing the image, in a step E34, the blocks Bi of the layers Ci which have a non-empty intersection with the macroblock $Mb_m$ are explored. The layers being stacked, each macroblock $Mb_m$ of the frame buffer is made up from, potentially, at least part of the pixels of several blocks $B_{mk}$ of each layer $C_i$ as illustrated in FIG. 6B. To detect whether a macroblock $MB_m$ has undergone alterations, as well as the nature of those modifications, the blocks $B_i$ of the layers $C_i$ which affect this macroblock $Mb_m$ must be analyzed.

If the corresponding blocks $B_i$ are marked in the macroblock alteration table as having been altered by the application, or if they are not totally transparent and the layer Ci to which they belong is in motion, or if this layer Ci undergoes a change in transparency, then the macroblock $MB_m$ of the memory buffer is recalculated. Thus, with this modeling, the step E35 of composing the display image from the layers $C_i$ is also simplified. In step E35 an image is composed from the layers $C_i$ according to display information transmitted by the application module 321.

In step E34 the data relating to the macroblock $MB_m$ in the macroblock alteration table are altered consequently to the alterations of the blocks Bi: in the table, it is indicated whether the macroblock $MB_m$ was altered from the preceding image, as well as the motion vectors corresponding to the layers $C_i$ which have induced an alteration in the macroblock $MB_m$ by their motion. Thus the encoding information for the encoding step can be created.

Arbitration is necessary if several layers $C_i$ have a different simultaneous translation. In this case, a criterion will be used for using the most appropriate vector $V_d$. In the encoding step it is possible, for example, to encode the macroblock $MB_m$i with the displacement vector $V_d$ of each layer $C_i$ concerned and to select the one for which the data compression is most effective.

The image composed by the modeling module 322 according to the application's display information is then transmitted to the encoding module 323 with the encoding information.

In step E36 of the method the encoding is performed by the encoder 323 based on encoding information transmitted by the modeling module 322.

Figure 7B:
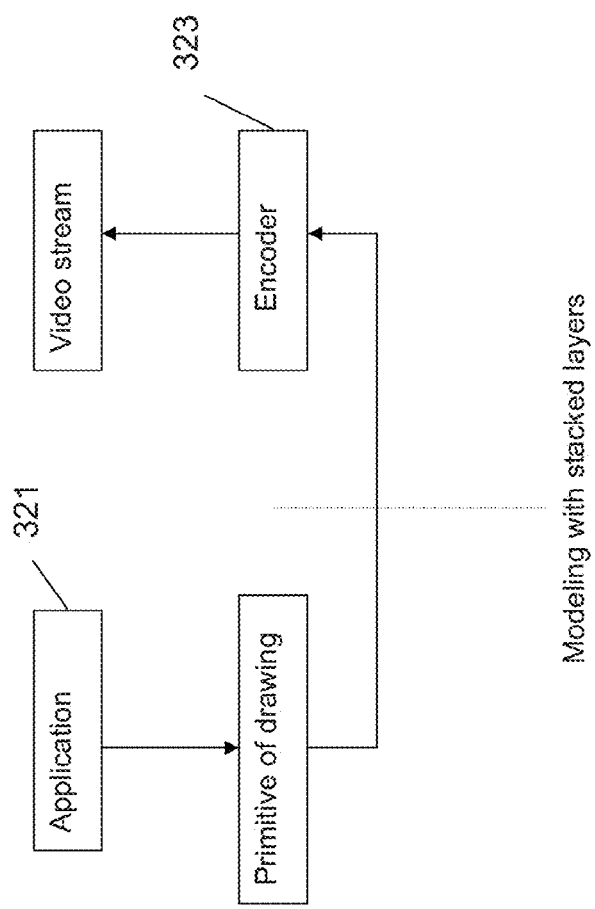
Figure 7C:
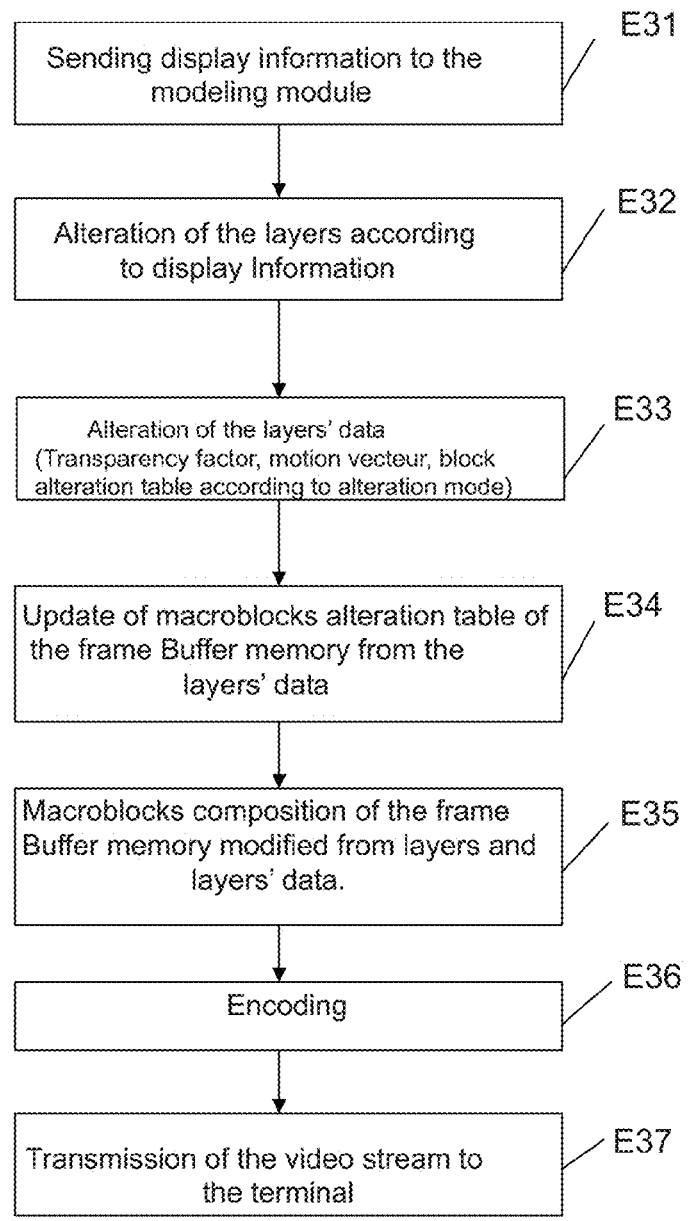

Referring to FIG. 7b the traditional internal structure of the video encoder 323 is designed to make use of the encoding information transmitted by the modeling module 322.

One so-called "asynchronous" part is built into the application. It is therefore synchronized to the user's actions. This part of the coder 323 organizes the data from the application in order to simplify the calculations of the so-called "synchronous" part of the encoding.

In a DCT (discrete cosine) transformation step, for each macroblock, each block constituting that macroblock is transformed using a 2-dimensional discrete cosine transformation.

The DCT transformation step is followed by a quantization step. This step consists of reducing the number of bits used to code each coefficient resulting from the DCT transformation. The quantization step is followed by an entropic coding step based on variable length or arithmetic codes.

An inverse quantization step is the inverse of the quantization PE4. An inverse DCT transformation is the inverse of the DCT transformation. These steps are performed for a differential estimation phase. In the differential estimation phase, when a macroblock is encoded in differential mode, a difference between the current image and the image sent previously is computed, just as for decoding. To reduce the quantity of information to be transmitted, a translation vector is applied to the macroblock of the preceding image so that it approximates as well as possible the current image. The search for this vector is called a "motion vector search." This difference is then transformed, quantized and then encoded.

The video stream consisting of images encoded according to the corresponding encoding information leaves the encoder 323 and is sent to the terminal 310 by an H324m connection in a step E37.

As the transmission of the video stream is carried out through radio waves, it is probable that during the session packets will be lost. It must therefore be ensured that each macroblock $MB_m$ of the image is encoded in the regular way in intracall mode. This is done in parallel, with a refresh pattern that will be adapted to the available bandwidth, to the desired responsiveness as well as to the level of packet loss resistance that is desired. This pattern may consist of one macroblock per image, one macroblock per "group of blocks," all the macroblocks in one out of two "groups of blocks," etc.

The synchronization between the application and the encoder should be performed with care. In particular, once the image is encoded, the blocks tagged as altered by the application can be tagged as unaltered before the application resumes control.

The terminal 310 receives the video stream and decodes it using the decoder 312 to display the user interface defined by the video stream on the screen 311.

A fourth embodiment of the invention proposes a method allowing a video sequence and/or audio data to be filmed, recorded and broadcast in a single step with a mobile terminal.

Figure 8A:
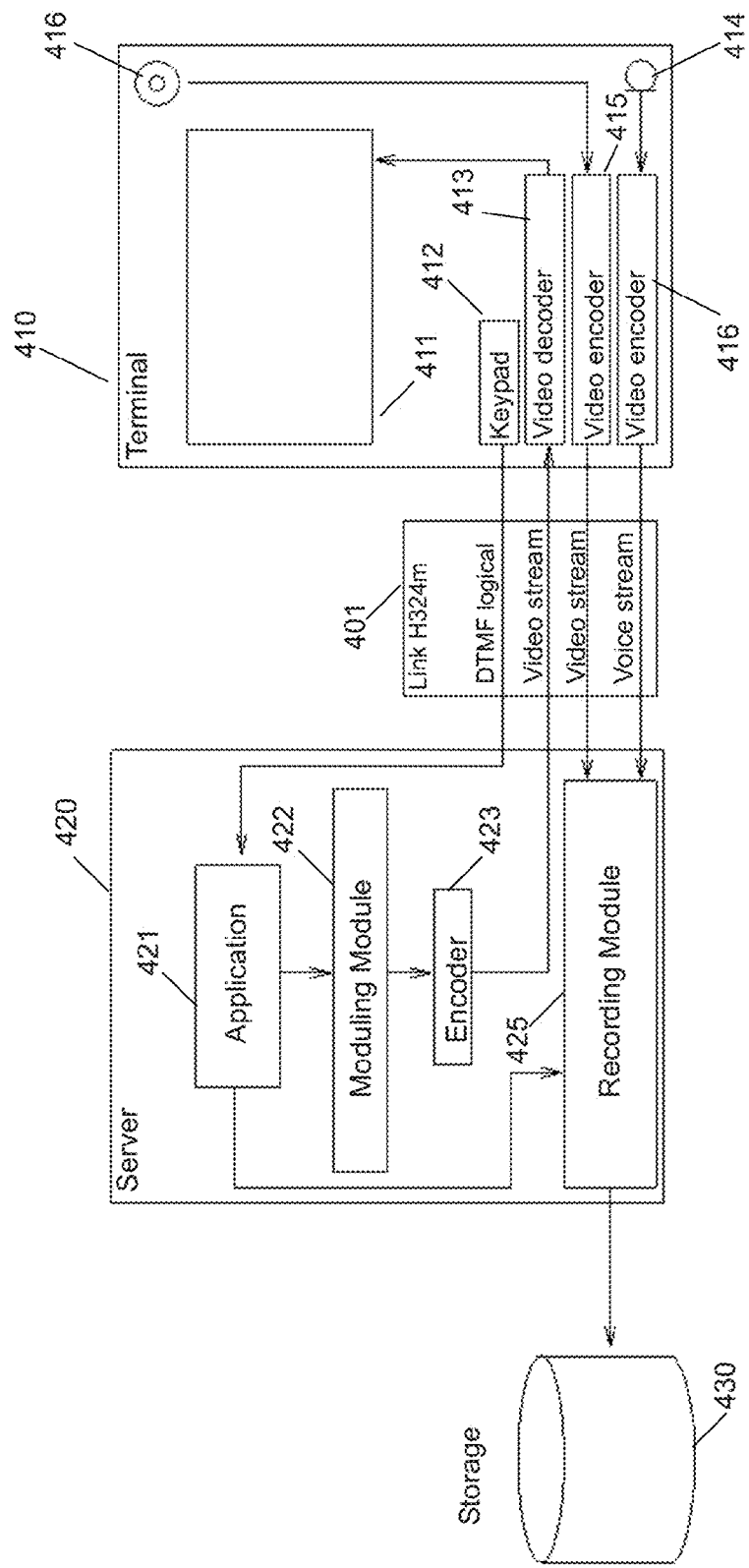

In this embodiment of the invention illustrated in FIGS. 8A through 8C, a terminal 410 and a server 420 communicate by means of a GSM 3G type network 401. The terminal 410 comprises a video decoder 413, a keypad 412 and a screen 411. The terminal 410 is equipped with a camera module 416 and a microphone 414 allowing the capture of image sequences and of the sound accompanying the image sequences, as well as a video encoder 415 and an audio encoder 416 for encoding a video stream and an audio stream respectively for transmission to the server 420 through an H324m protocol audiovisual connection 401.

The server 420 comprises an application module, a modeling module 422, an encoder for encoding a video stream and a recording module 425 for recording an audio stream and/or a video stream from the uplink of the terminal 410. The application module 425 has access to two databases: a first database 431 storing user profiles and a second database 432 storing the audiovisual content received from a mobile terminal and recorded. The data corresponding to the user profile can include data identifying at least one social networking account and/or an audio/video sequence broadcasting service account to which the user is subscribed. Of course, the user profile data and the audiovisual content can be stored in the same database 430. The modeling module 422 and the encoder 423 operate in the same way as the modeling module 322 and the encoder 323 of the third embodiment, described above.

The recording application 425 can make use of functionalities allowing an intuitive interface to be displayed on the screen 411 of the terminal 410, allowing it to control the start and the end of the recording, to give a name to the sequence and to put it on-line.

The recording application can also make use of the caller's number received within the application server 420 in order to create a link between the recorded sequence and the user who created it. The user profile can also allow, for example, public videos to be distinguished from private videos.

The recording application on the server 420 can use code conversion software in real time for conversion of audiovisual data to a format readable by a reproducer of the PC type, Flash format, etc. for example. It is thus possible to broadcast on line the sequence captured by the terminal in real time with a very slight delay.

The user of the terminal 410 records an audiovisual sequence of a scene 430. H uses the user interface generated by the server 420 and displayed on the screen 411 of the terminal 410 to control the start and the end of the recording and to give a name to the recorded sequence. Of course, the sequence can be sent without being recorded on the terminal. The audiovisual data of the recorded scene are then sent via the network 401 to the server 420. On the server 420 the recording module 425 records the audiovisual data and the identifying number of the terminal 410 and thus creates a link between the audiovisual data and the user. The sequence is converted in real time into Flash format, for example, and then sent via an internet network to an online broadcasting service 440. The sequence of the recorded scene 430 can be broadcast and thus viewed from the terminal 410 and other terminals such as for example a personal computer 450. The broadcast of the audiovisual sequence corresponding to the video and/or audio data is monitored through the wireless audiovisual connection between the terminal 410 and the server 420.

The server 420 creates a unique random URL pointing to these transmitted video and/or audio data. Then a text message containing the unique random URL can be sent to a personal account of the user on a Web-based social networking site, such as a twitter.com account or a Facebook account, for example, thus allowing the user's friends to gain access to the audiovisual sequence.

Once the audiovisual sequence is uploaded to the broadcasting service, the user can communicate the automatically generated URL to persons to whom he would like to broadcast his sequence. To that end he can communicate this URL to his friends through an email or a message on a social networking service such as Twitter or Facebook.

Thus the system allows a user of a terminal to very quickly film unexpected sequences and put them on-line. It also allows these sequences to be viewed from a 3G Visio mobile telephone with interoperability and access time advantages.

In one embodiment of the invention the server 420 can be arranged to broadcast audio/video sequences online without going through a broadcast system independent of the server.

Figure 9A:
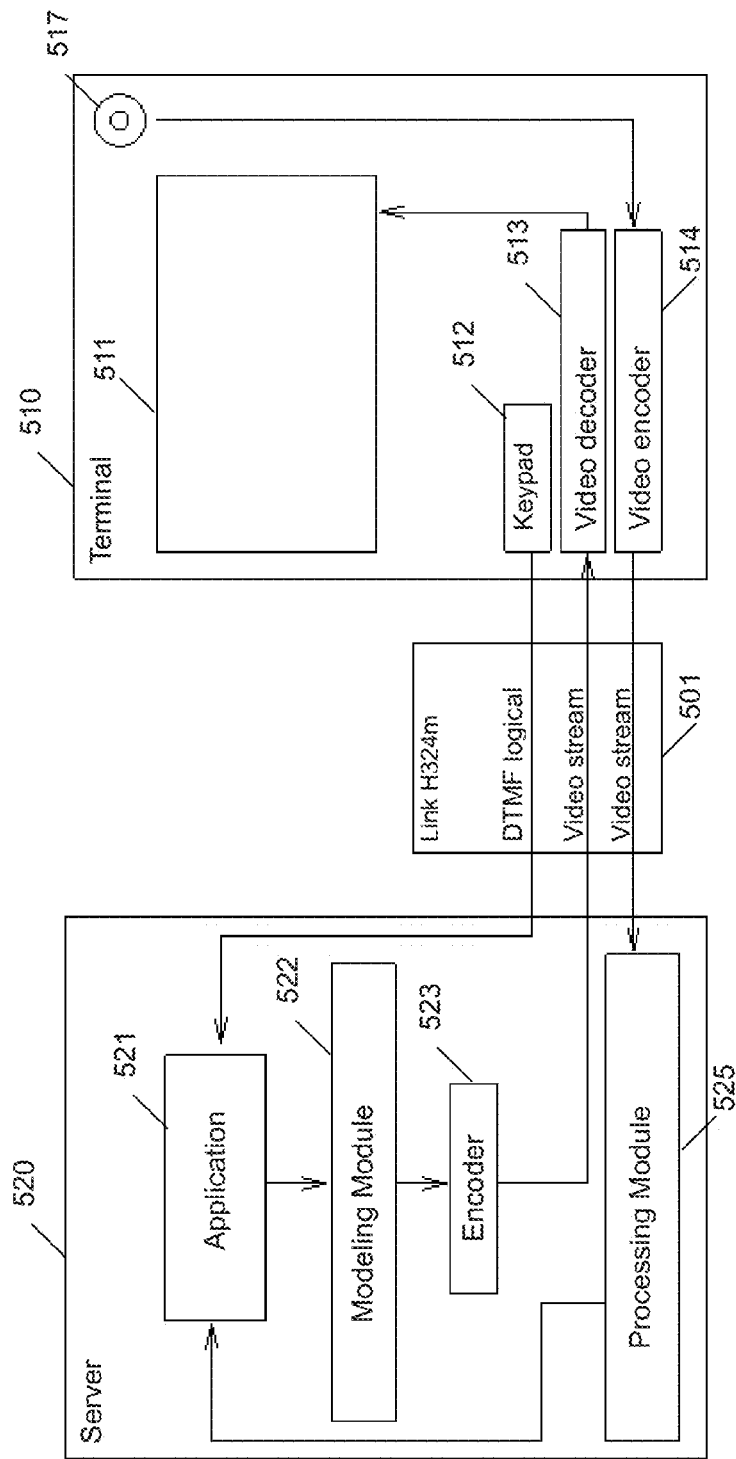

In a fifth embodiment of the invention illustrated in FIGS. 9A through 9C a terminal 510 and a server 520 communicate by means of a GSM 3G type network 501 with an H324m connection. The terminal 510 is equipped with a video encoding module 514, a video decoder 513, a keypad 512, a camera 517 and a screen 511.

The server 520 comprises an application module 521, a modeling module 522 and an encoder 523. The application module 521, the modeling module 522 and the encoder 523 operate in the same way as the application module, the modeling module and the encoder of the third embodiment described above. The server 520 also comprises a processing module 525 for decoding and processing a video stream received from the terminal 510.

In this embodiment of the invention illustrated in FIG. 9B, the server 520 receives a video stream produced by a 3G Visio mobile telephone 510. This stream, if it is encoded according to good practice, contains motion vectors Vm calculated by the encoding module 514 of the mobile telephone 510 for the purpose of compressing the video sequence.

In addition to being used for decompressing the video sequence, these motion vectors Vm can be used to estimate the movements of the telephone handset 510.

Referring to FIG. 9b, the motion vectors Vm can be processed by the processing module 515 of the server 520 to determine that the mobile telephone 510 has moved from a position PS1 to a new position PS2. Depending on this movement, the application server 520 sends a display S1 corresponding to a first part of a virtual image IV1 when the terminal is at a position PS1, and then when the server 520 detects that the terminal 510 has moved to a position PS2 the server 520 sends a display S2 corresponding to a second part of the virtual image IV2.

Thus, without additional computation in the telephone handset 510 or on the server 520, and without installing an additional application on the telephone 510, the images presented to the user on the screen 511 of the telephone can report these movements and allow him to navigate within a virtual image that is larger than his physical screen 511 as for example a map, a selection list, etc.

Additionally, moving the handset to the right can, for example, mean switching to the next image in the case of viewing a photo album. The movement of the handset can be used to make a pointer move on the screen (like a mouse on a computer).

Of course, the invention is not limited to the embodiments described and shown above, from which other modes and other forms of construction can be contemplated without thereby departing from the scope of the invention.

For example, variations of the first embodiment could be contemplated, having features of the other embodiments. For example in the variations the server of the first, second, fourth or fifth embodiment can be equipped with a modeling module and an encoder according to the third embodiment.

Additionally, in other variations, the terminal according to the third, fourth or fifth embodiment of the invention can be equipped with a pointer according to the second embodiment of the invention.

In other variations, the server according to the first, second, third, fifth embodiment of the invention can be equipped with a recording module according to the fourth embodiment to allow audiovisual data captured by a terminal to be put directly online.

In other variations, the server according to the first, second, third or fourth embodiment of the invention can be equipped with a processing module according to the fifth embodiment to allow the movements of a terminal to be determined based on the motion vectors of the video data.

It will be noted that the invention is not limited to a pure software implementation (sequence of instructions in a data processing program), by may also be implemented in hardware form or any form combining a hardware and a software part. In the case where the invention is partially or totally implemented in software form, the corresponding instruction sequence can be stored in a removable (such as for example a diskette, a CD-ROM, a DVD-ROM, etc.) or fixed storage medium, this storage medium being partially or totally readable by a computer or a microprocessor.

The invention claimed is:

1. A method for modeling in a processor a display coming from an application on a server, the display being destined for a remote terminal, characterized in that the display is modeled to compose an image based on display information coming from the application, by means of stacked layers, each layer consisting of layer pixels, and being associated with a corresponding first alteration data set, the layer pixels being grouped into layer pixel blocks, each layer pixel being characterized by a transparency factor $T_{lp}$ of said pixel;

the first alteration data set comprising, for each layer, a motion vector of said layer and transparency data of said layer, the resulting image consisting of image pixels and being associated with a second alteration data set, the image pixels being grouped into macroblocks, the second alteration data set indicating whether the macroblocks of the image were altered due to alteration of the layers by the application, the image pixels being made up of the corresponding stacked pixels of the layers; the method comprising the following steps:

alteration of the content of the layer pixels of at least one layer by at least one primitive according to the display information received from the application;

alteration of the first alteration data set for at least one layer according to alteration performed by the primitive(s);

alteration of the second alteration data set according to the first data set;

composition of an image based on the layer pixels, the transparency data corresponding to a block of a layer affecting a macroblock of the composite image being used to determine whether said image macroblock was altered from the macroblock of the preceding image, and transmission to an encoder of the image to be encoded and of encoding information in compliance with the second alteration data set.

2. A method according to claim 1 wherein the transparency data of a layer include a transparency factor of said layer and a transparency indication for each block of said layer, the transparency indication indicating whether said block is completely transparent, completely opaque or neither.

3. A method according to claim 1 wherein the first alteration data set also comprises alteration data indicating for each pixel block of said layer whether said block was altered by the application.

4. A method according to claim 3 wherein, if the first alteration data set indicates that a layer block affecting a macroblock of the composite image was altered by the application, or if said layer block is not totally transparent and the layer to which it belongs is undergoing movement, or if the transparency factor of said layer indicates that the layer is undergoing a change in transparency, then the image macroblock is recomposed.

5. A method according to claim 1, characterized in that the step of altering the second alteration data set comprises, for each pixel macroblock of the image to be encoded, a search within the first data set for layer pixel blocks affecting the macroblock which have been altered by the application, in order to determine whether the pixel macroblock of the image to be encoded has been altered.

6. A method according to claim 1 wherein the second alteration data set includes a motion vector for each pixel macroblock of the image for use in a differential encoding, the motion vector being determined based on displacement vectors of the layers of which at least one block has induced an alteration in said macroblock.

7. A method according to claim 6 characterized in that, if several layers used to compose the image have undergone simultaneous translation, the displacement vector Vd for encoding is selected from among the displacement vectors of the layers which have undergone translation, according to a predetermined criterion.

8. A method according to claim 1 characterized in that the second alteration data set indicates, for each pixel macroblock, whether said macroblock was altered from the preceding image, and wherein only the altered macroblocks are then encoded by the encoder.

9. A method for encoding an image in a processor, the method comprising reception of an image and encoding information for encoding the image, the image and the encoding information being generated by the method according to claim 1 encoding the information using the encoding information.

10. A method according to claim 9 characterized in that each macroblock is encoded in the regular way in intracall mode for transmission to the terminal.

11. A modeling device for a display coming from an application on a server, the display being destined for a remote terminal, characterized in that the display is modeled for composing an image based on display information coming from the application, by means of stacked layers, each layer consisting of layer pixels and being associated with a corresponding first alteration data set, the layer pixels being grouped into layer pixel blocks, each layer pixel being characterized by a transparency factor $T_{tp}$ of said pixel;

the first alteration data set comprising for each layer a motion vector of said layer and of the transparency data of said layer, the resulting image consisting of image pixels and being associated with a second alteration data set, the second alteration data set indicating whether the image macroblocks were altered due to the alteration of the layers by the application, the image pixels consisting of the superimposed corresponding pixels of the layers; the method comprising the following steps:

means for altering the content of at least one layer by at least one primitive according to the display information received from the application;

means for altering the content of the first alteration data set for at least one layer according to the alterations carried out by the primitive(s);

means for altering the second data set according to the first data set;

means for composing an image according to the content of the layers, the transparency data corresponding to a block of a layer affecting a macroblock of the composite image being used for determining whether said macroblock of the image was altered with respect to the macroblock of the preceding image; and means for transmitting to an encoder the image to be encoded and encoding information in compliance with the second alteration data set.

12. A non-transitory computer-readable storage medium containing a software program for implementing the method according to claim 1, downloadable via a telecommunication network and/or stored in a memory of a processing device and/or stored in a memory medium designed to cooperate with a processing device.

13. An encoder designed to receive an image generated by the method according to claim 1 and encoding information generated by the method according to claim 1, the encoder being designed so as to encode the image using the encoding information.

14. An encoder according to claim 13 designed to encode each image macroblock in the regular way in intracall mode for transmission to the terminal.

* * * * *